US012644766B2

(12) United States Patent
Nozaki et al.

(10) Patent No.: US 12,644,766 B2
(45) Date of Patent: Jun. 2, 2026

(54) SPECTROSCOPIC DEVICE

(71) Applicant: HAMAMATSU PHOTONICS K.K., Hamamatsu (JP)

(72) Inventors: Makoto Nozaki, Hamamatsu (JP); Naoto Sakurai, Hamamatsu (JP); Norihiro Iwasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 157 days.

(21) Appl. No.: 18/717,560

(22) PCT Filed: Oct. 27, 2022

(86) PCT No.: PCT/JP2022/040218
§ 371 (c)(1),
(2) Date: Jun. 7, 2024

(87) PCT Pub. No.: WO2023/127269
PCT Pub. Date: Jul. 6, 2023

(65) Prior Publication Data
US 2025/0052611 A1 Feb. 13, 2025

(30) Foreign Application Priority Data
Dec. 27, 2021 (JP) ................................. 2021-212258

(51) Int. Cl.
*G01J 3/06* (2006.01)
*G01J 3/18* (2006.01)
*G01J 3/28* (2006.01)

(52) U.S. Cl.
CPC . *G01J 3/06* (2013.01); *G01J 3/18* (2013.01); *G01J 3/2803* (2013.01); *G01J 2003/064* (2013.01)

(58) Field of Classification Search
CPC .......... G01J 2003/064; G01J 3/18; G01J 3/06; G01J 3/2803
See application file for complete search history.

(56) References Cited

U.S. PATENT DOCUMENTS

| 2002/0162954 A1 | 11/2002 | Joukawa et al. | |
| 2004/0125374 A1* | 7/2004 | Berger ...................... | G01J 3/18 |
| | | | 356/364 |
| 2006/0285109 A1* | 12/2006 | Odhner ................. | G01J 3/1804 |
| | | | 356/328 |

FOREIGN PATENT DOCUMENTS

| EP | 0271602 A1 * | 6/1988 | ............... G01J 3/02 |
| JP | 2006-208243 A | 8/2006 | |

(Continued)

OTHER PUBLICATIONS

European Search Report issued on Oct. 22, 2025 in corresponding European patent application 22915502.3.

(Continued)

*Primary Examiner* — Maurice C Smith
(74) *Attorney, Agent, or Firm* — Faegre Drinker Biddle & Reath LLP

(57) ABSTRACT

A spectroscopic device includes a swing element having a swing surface, a diffraction grating configured to disperse measurement light reflected by the swing surface, a first light detection unit including a first light detector that detects a part of the measurement light dispersed by the diffraction grating, a light source configured to emit inspection light, and a second light detection unit including a second light detector configured to detect the inspection light reflected by the swing surface. The swing element includes a support portion, a movable portion having the swing surface, and a coupling portion coupling the support portion and the movable portion such that a swing angle of the swing surface changes with a predetermined axis as a center line. The (Continued)

second light detection unit has an elongated light receiving region in which a moving direction of the inspection light is a longitudinal direction.

19 Claims, 18 Drawing Sheets

(56)                    References Cited

FOREIGN PATENT DOCUMENTS

| JP | 2011-257140 A | 12/2011 | |
|----|---------------|---------|---|
| JP | 2016-128789 A | 7/2016 | |
| JP | 2021-148671 A | 9/2021 | |
| JP | 2022111364 A * | 7/2022 | ............ G01J 3/0256 |
| WO | WO-96/026414 A1 | 8/1996 | |

OTHER PUBLICATIONS

International Preliminary Report on Patentability mailed Jul. 11, 2024 for PCT/JP2022/040218.

* cited by examiner (a)

SPECTROSCOPIC DEVICE

TECHNICAL FIELD

The present disclosure relates to a spectroscopic device.

BACKGROUND ART

As a spectroscopic device of the related art, Patent Literature 1 describes a spectrometer including a micro electro mechanical systems (MEMS) mirror that scans incident measurement light, a diffraction grating that disperses the measurement light scanned by the MEMS mirror, and a photodiode that detects a part of the measurement light dispersed by the diffraction grating. According to such a spectroscopic device, since a wavelength of a part of the measurement light incident on the photodiode changes in accordance with a swing angle of a mirror surface of the MEMS mirror, data regarding the wavelength of the measurement light can be acquired.

CITATION LIST

Patent Literature

Patent Literature 1: Japanese Unexamined Patent Publication No. 2011-257140

SUMMARY OF INVENTION

Technical Problem

In the spectroscopic device described above, since the swing angle of the mirror surface corresponds to a drive signal input to the MEMS mirror, it is possible to specify the wavelength of a part of the measurement light incident on the photodiode based on the drive signal. However, even though the same drive signal is input to the MEMS mirror, the swing angle of the mirror surface is not constantly the same due to, for example, a change in environmental temperature. Accordingly, in the spectroscopic device described above, the data regarding the wavelength of the measurement light cannot be accurately acquired.

An object of the present disclosure is to provide a spectroscopic device capable of accurately acquiring data regarding a wavelength of measurement light.

Solution to Problem

A spectroscopic device according to an aspect of the present disclosure includes a swing element having a swing surface and disposed such that measurement light is incident on the swing surface, a diffraction grating disposed at a first position on the swing surface or a second position away from the swing surface, the diffraction grating configured to disperse the measurement light traveling to be incident on the swing surface in a case where the diffraction grating is disposed at the first position, and the diffraction grating configured to disperse the measurement light reflected by the swing surface in a case where the diffraction grating is disposed at the second position, a first light detection unit including a first light detector configured to detect a part of the measurement light dispersed by the diffraction grating, a light source configured to emit inspection light to be incident on the swing surface, and a second light detection unit including a second light detector configured to detect a part of the inspection light dispersed by the diffraction grating or the inspection light reflected by the swing surface in a case where the diffraction grating is disposed at the first position and configured to detect the inspection light reflected by the swing surface in a case where the diffraction grating is disposed at the second position. The swing element includes a support portion, a movable portion having the swing surface, and a coupling portion coupling the support portion and the movable portion such that a swing angle of the swing surface changes with a predetermined axis as a center line, and the second light detection unit has an elongated light receiving region in which a moving direction of the inspection light is a longitudinal direction.

In the spectroscopic device according to the aspect of the present disclosure, the light source emits the inspection light to be incident on the swing surface of the swing element, and the second light detector detects a part of the inspection light dispersed by the diffraction grating on the swing surface or the inspection light reflected by the swing surface. The second light detection unit including the second light detector has the elongated light receiving region in which the moving direction of the inspection light is the longitudinal direction. Accordingly, the incident position of the inspection light in the light receiving region can be specified in the longitudinal direction, and, for example, the data indicating the swing angle of the swing surface when the first light detector detects a part of the measurement light can be accurately acquired based on the data indicating the incident position of the inspection light in the light receiving region. Accordingly, according to the spectroscopic device of the aspect of the present disclosure, the data regarding the wavelength of the measurement light can be accurately acquired.

In the spectroscopic device according to the aspect of the present disclosure, the diffraction grating may be disposed at the second position. According to this, it is possible to improve the degree of freedom in manufacturing the diffraction grating while facilitating the manufacturing of the swing element.

The spectroscopic device according to the aspect of the present disclosure may further include a support member having a depressed surface and disposed such that the measurement light is incident on the depressed surface, and the diffraction grating may be formed along the depressed surface. According to this, a part of the measurement light diffracted by the diffraction grating can be efficiently incident on the first light detection unit.

In the spectroscopic device according to the aspect of the present disclosure, the diffraction grating may be disposed at the first position. According to this, the configuration of the spectroscopic device can be simplified.

The spectroscopic device according to the aspect of the present disclosure may further include a control unit configured to control each of the swing element, the first light detector, and the second light detector. The control unit may control the swing element such that the swing angle changes in a step shape including a plurality of stop times during which the swing angle is maintained constant and a plurality of operation times during which the swing angle changes, acquire a first detection signal based on an amount of charges accumulated in the first light detector in each of the plurality of stop times and a second detection signal based on an amount of charges accumulated in the second light detector in each of the plurality of stop times, and generate data regarding a wavelength of the measurement light based on the first detection signal and the second detection signal. According to this, since the swing angle is maintained constant in each stop time, it is possible to increase the signal amount by securing the accumulation time of the charge in each of the first light detector and the second light detector for each different swing angle. As a result, since an S/N ratio (signal-to-noise ratio) is improved, the data regarding the wavelength of the measurement light such as data indicating a spectrum of the measurement light can be generated with high accuracy. In particular, since the measurement light is dispersed by the diffraction grating, the light amount of the measurement light detected by the first light detector tends to be weak. Accordingly, the above configuration that can increase the signal amount by securing the accumulation time of the charge in the first light detector is effective. In addition, for example, in a case where the measurement light is light in the mid-infrared range, the measurement light tends to be weak light as compared with a case where the measurement light is the light in the visible range, and in general, the sensitivity of the light detector to the light in the mid-infrared range is often lower than the sensitivity of the light detector to the light in the visible range. Accordingly, the above configuration is extremely effective in such a case.

In the spectroscopic device according to the aspect of the present disclosure, the control unit may control the swing element such that the swing angle changes in a first rotation with the axis as a center line in a first time and the swing angle changes in a second rotation opposite to the first rotation with the axis as the center line in a second time after the first time. According to this, the data regarding the wavelength of the measurement light can be acquired in the order of shorter wavelength or higher wavelength.

In the spectroscopic device according to the aspect of the present disclosure, the control unit may control the swing element such that the swing angle changes in the step shape in any one of the first time or the second time. According to this, the data regarding the wavelength of the measurement light can be efficiently generated.

In the spectroscopic device according to the aspect of the present disclosure, one time of the first time and the second time during which the swing angle changes in the step shape may be longer than the other time of the first time and the second time. According to this, the number of stop times during which the swing angle is maintained constant is increased, and the wavelength resolution when the data regarding the wavelength of the measurement light is acquired can be improved. In addition, for example, in a case where the swing element is a MEMS device, minute vibration may occur on the swing surface due to sudden stop of the swing surface immediately after the start of each stop time. In such a case, a sufficient length of stop time is secured, and thus, it is possible to accumulate the charge in each of the first light detector and the second light detector in a state where minute vibration of the swing surface is settled. As a result, it is possible to generate data regarding the wavelength of the measurement light with higher accuracy.

In the spectroscopic device according to the aspect of the present disclosure, the second light detector may have a plurality of light detection channels aligned in the longitudinal direction, and the control unit may control the swing element such that at least a part of the accumulations of the charges in the plurality of stop times is performed for each different light detection channel of the plurality of light detection channels, and control the second light detector such that the charges are accumulated continuously over the plurality of stop times and readout of the charge is performed after the plurality of stop times. According to this, since the numbers of times of reading out the charges in the first time and the second time of one cycle are reduced, a processing load of the control unit can be reduced.

In the spectroscopic device according to the aspect of the present disclosure, the control unit may control the swing element such that the swing angle changes in the step shape in the first time, and control the second light detector such that the accumulations of the charges are performed simultaneously over the plurality of stop times in the first time and the readout of the charge is performed in the second time. According to this, since the numbers of times of reading out the charges in the first time and the second time of one cycle become one, the processing load of the control unit can be reduced.

In the spectroscopic device according to the aspect of the present disclosure, the control unit may control the second light detector such that the accumulation of the charge is performed in each of the plurality of stop times and the readout of the charge is performed in each of the plurality of operation times. According to this, for example, the swing angle of the swing surface can be changed in a step shape while finely adjusting the swing angle of the swing surface based on the second detection signal. In addition, for example, the swing angle of the swing surface is adjusted to a desired swing angle based on the second detection signal, and data regarding a desired wavelength included in the measurement light can be acquired.

In the spectroscopic device according to the aspect of the present disclosure, the light receiving region may be provided in the second light detector, and the second light detector includes a plurality of light detection channels aligned in the longitudinal direction in the light receiving region. According to this, the configuration of the second light detection unit can be simplified.

In the spectroscopic device according to the aspect of the present disclosure, the light receiving region may be provided in the second light detector, the second light detector may have a light receiving surface extending in the longitudinal direction in the light receiving region, and a width of the light receiving surface in a direction perpendicular to the longitudinal direction may change in accordance with a position in the longitudinal direction. According to this, a configuration of a readout circuit of the second light detector can be simplified.

In the spectroscopic device according to the aspect of the present disclosure, the second light detection unit may further include a first optical member disposed on an optical path between the swing surface and the second light detector, the light receiving region may be provide in the first optical member, and the first optical member may be a filter of which a transmittance of the inspection light in the light receiving region changes in accordance with a position in the longitudinal direction. According to this, a configuration of a readout circuit of the second light detector can be simplified.

In the spectroscopic device according to the aspect of the present disclosure, the second light detection unit may further include a first optical member disposed on an optical path between the swing surface and the second light detector, the light receiving region may be provided in the first optical member, the first optical member may have a slit extending in the longitudinal direction in the light receiving region, and a width of the slit in a direction perpendicular to the longitudinal direction may change in accordance with a position in the longitudinal direction. According to this, a configuration of a readout circuit of the second light detector can be simplified.

In the spectroscopic device according to the aspect of the present disclosure, the second light detection unit may further include a second optical member disposed on an optical path between the first optical member and the second light detector, and the second optical member may condense the inspection light having passed through the first optical member on the second light detector. According to this, the second light detector can be downsized.

In the spectroscopic device according to the aspect of the present disclosure, the second light detector has a single light detection channel. According to this, a configuration of a readout circuit of the second light detector can be simplified.

In the spectroscopic device according to the aspect of the present disclosure, the inspection light may have a center wavelength outside a wavelength range of the measurement light. According to this, the measurement light can be prevented from becoming the noise in the detection of the inspection light.

In the spectroscopic device according to the aspect of the present disclosure, the second light detector may have sensitivity to a wavelength outside a wavelength range of the measurement light. According to this, the measurement light can be prevented from becoming the noise in the detection of the inspection light.

Advantageous Effects of Invention

According to the present disclosure, it is possible to provide the spectroscopic device capable of accurately acquiring the data regarding the wavelength of the measurement light.

BRIEF DESCRIPTION OF DRAWINGS

FIG. 8 is a configuration diagram of a spectroscopic device according to a third embodiment.

FIG. 11 is a configuration diagram of a spectroscopic device according to a fourth embodiment.

DESCRIPTION OF EMBODIMENTS

Figure 1:
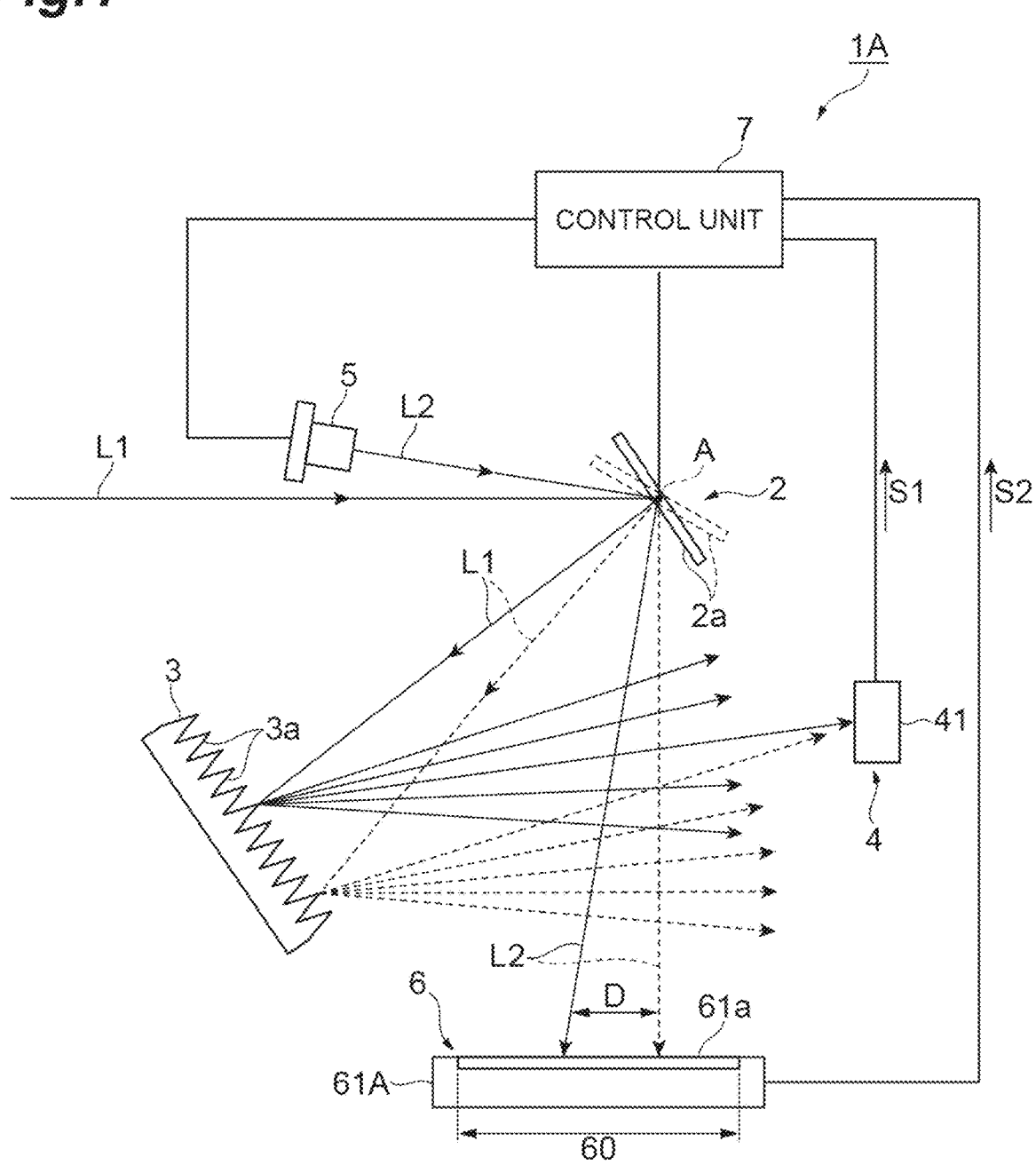
FIG. 1 is a configuration diagram of a spectroscopic device according to a first embodiment.

Hereinafter, embodiments of the present disclosure will be described in detail with reference to the drawings. In the drawings, the same or corresponding parts are denoted by the same reference signs, and redundant description will be omitted.

First Embodiment

As illustrated in FIG. 1, a spectroscopic device 1A according to a first embodiment includes a swing element 2, a diffraction grating 3, a first light detection unit 4, a light source 5, a second light detection unit 6, and a control unit 7. The spectroscopic device 1A is a device for dispersing measurement light L1 incident from an outside to acquire data regarding a wavelength of the measurement light L1, such as data indicating a spectrum of the measurement light L1. A wavelength range of the measurement light L1 is, for example, a wavelength range from a near-infrared range to a mid-infrared range. The swing element 2, the diffraction grating 3, the first light detection unit 4, the light source 5, and the second light detection unit 6 are disposed in a housing (not illustrated) in which a light incident portion (not illustrated) on which the measurement light L1 is incident from the outside is provided. The housing may have a configuration in which reflection of the measurement light L1 and inspection light L2 to be described later is suppressed inside, for example, by applying a black paint to an inner surface or applying an antireflection coating to the inner surface. In this case, it is possible to prevent stray light from being incident on each of the first light detection unit 4 and the second light detection unit 6. In addition, the light source 5 may be disposed outside the housing, and the inspection light L2, to be described later, which is emitted from the light source 5 may be incident into the housing via the light incident portion.

The swing element 2 has a swing surface 2a that functions as a mirror surface. The swing element 2 is disposed such that the measurement light L1 is incident on the swing surface 2a. The swing surface 2a is a surface parallel to the axis (predetermined axis) A, and swings with the axis A as a center line. The measurement light L1 is incident on the swing surface 2a along a direction perpendicular to an axis A.

Figure 2:
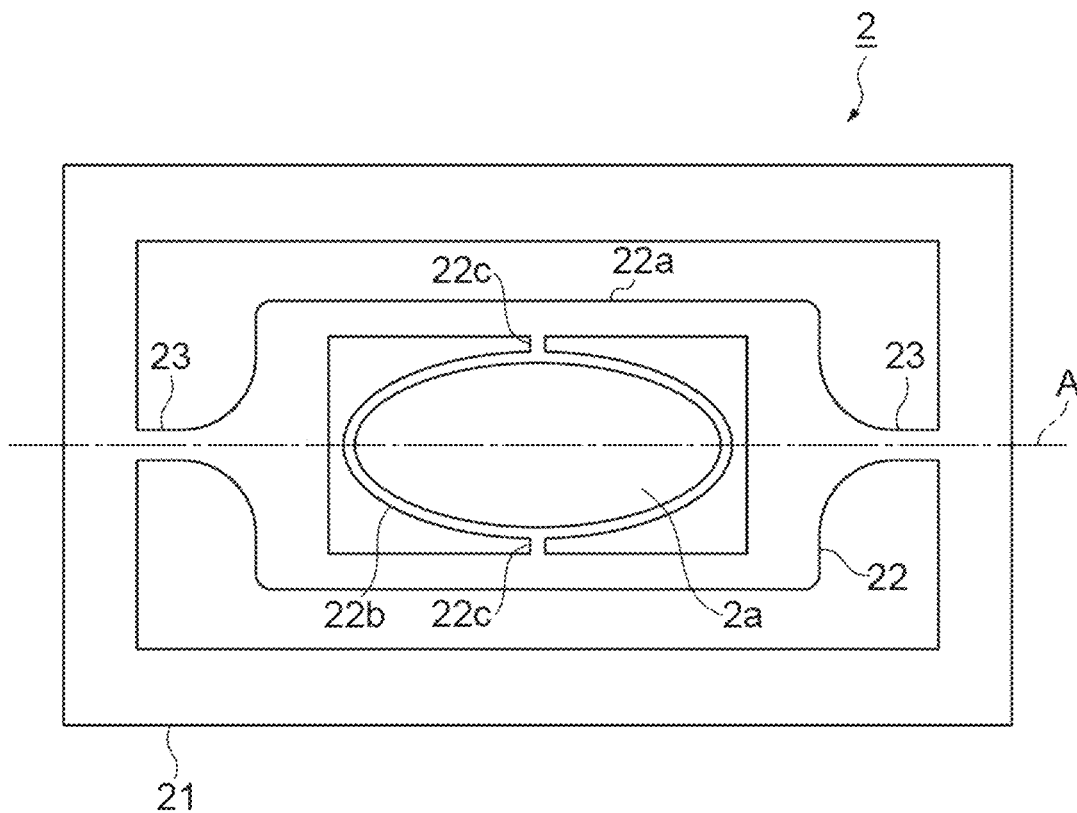
FIG. 2 is a plan view of a swing element illustrated in FIG. 1.

As illustrated in FIG. 2, the swing element 2 includes a support portion 21, a movable portion 22, and a pair of coupling portions 23. The swing element 2 is a micro electro mechanical systems (MEMS) device. The support portion 21, the movable portion 22, and the pair of coupling portions 23 are integrally formed by using, for example, a silicon on insulator (SOI) substrate. The movable portion 22 has the swing surface 2a and is disposed on the axis A. The support portion 21 surrounds the movable portion 22 along a plane including the axis A. The pair of coupling portions 23 is disposed on both sides of the movable portion 22 on the axis A. The pair of coupling portions 23 couples the support portion 21 and the movable portion 22 such that a swing angle of the swing surface 2*a* changes with the axis A as a center line. Each of the pair of coupling portions 23 is, for example, a torsion bar extending along the axis A.

The movable portion 22 includes a frame portion 22*a*, a body portion 22*b*, and a pair of connection portions 22*c*. The body portion 22*b* has a swing surface 2*a* and is disposed on the axis A. As an example, a width of the swing surface 2*a* in each of a direction parallel to the axis A and the direction perpendicular to the axis A is about several mm (preferably, about 1 to 5 mm). The frame portion 22*a* surrounds the body portion 22*b* along a plane including the axis A. The pair of connection portions 22*c* is disposed on both sides of the body portion 22*b* on an axis parallel to the swing surface 2*a* and perpendicular to the axis A. The pair of connection portions 22*c* couples the frame portion 22*a* and the body portion 22*b*. The movable portion 22 may not include the frame portion 22*a* and the pair of connection portions 22*c*. That is, a slit may not be formed in the movable portion 22. The swing surface 2*a* may be formed on the entire movable portion 22 or a part of the movable portion 22. In a case where the swing surface 2*a* is formed in a part of the movable portion 22, an outer edge of the swing surface 2*a* may not be along an outer edge of the movable portion 22.

Various drive systems such as an electromagnetic force system, an electrostatic force system, and a piezoelectric system can be applied to the swing element 2 having the above configuration. The electromagnetic force system is a drive system in which a swing angle of the swing surface 2*a* is changed by a Lorentz force acting on a coil provided in the frame portion 22*a* by causing a current to flow through the coil in a state where a magnetic field is formed by a magnetic field generation unit such as a permanent magnet. The electrostatic force system is a drive system in which the swing angle of the swing surface 2*a* is changed by electrostatic force acting between a plurality of first comb-shaped electrodes and a plurality of second comb-shaped electrodes by applying a voltage between the plurality of first comb-shaped electrodes provided on the support portion 21 and the plurality of second comb-shaped electrodes provided on the frame portion 22*a*. The piezoelectric system is a drive system in which the swing angle of the swing surface 2*a* is changed by distortion generated in a piezoelectric element installed in each of the pair of coupling portions 23 by applying a voltage to a piezoelectric element.

As illustrated in FIG. 1, the diffraction grating 3 is disposed at a position (second position) away from the swing surface 2*a*. In this case, the diffraction grating 3 has, for example, a diffraction grating surface having a rectangular shape with one side of about ten and several millimeters. The diffraction grating 3 disperses the measurement light L1 reflected by the swing surface 2*a*. The diffraction grating 3 includes a plurality of grating grooves 3*a*. The plurality of grating grooves 3*a* are aligned in the direction perpendicular to the axis A in a state of extending in the direction parallel to the axis A. The measurement light L1 incident on the diffraction grating 3 is dispersed in accordance with a wavelength along a plane perpendicular to the axis A.

The first light detection unit 4 includes a first light detector 41. The first light detector 41 detects a part of the measurement light L1 dispersed by the diffraction grating 3. As an example, the first light detector 41 is an optical semiconductor device made of a compound semiconductor, and is a single element having sensitivity in a wavelength range from a near-infrared range to a mid-infrared range.

Here, a wavelength of a part of the measurement light L1 incident on the first light detector 41 changes in accordance with an incident position of the measurement light L1 on the diffraction grating 3. In other words, a wavelength of a part of the measurement light L1 incident on the first light detector 41 changes in accordance with the swing angle of the swing surface 2*a*. Accordingly, data indicating a correspondence relationship between the swing angle of the swing surface 2*a* and the wavelength of the light incident on the first light detector 41 is acquired in advance, and thus, it is possible to acquire the data regarding the wavelength of the measurement light L1. The first light detection unit 4 may further include an aperture member disposed in front of the first light detector 41. According to such a configuration, a wavelength resolution when the data regarding the wavelength of the measurement light L1 is acquired can be improved.

The light source 5 emits the inspection light L2 to be incident on the swing surface 2*a*. The inspection light L2 has a center wavelength outside the wavelength range of the measurement light L1. The light source 5 includes, for example, a semiconductor laser, a vertical cavity surface emitting laser (VCSEL), or the like, and emits a laser beam having a center wavelength in the visible range as the inspection light L2. The inspection light L2 emitted from the light source 5 is incident on the swing surface 2*a* along the direction perpendicular to the axis A. Regardless of the magnitude of the swing angle of the swing surface 2*a*, the incident angle of the inspection light L2 with respect to the swing surface 2*a* is larger than an incident angle of the measurement light L1 with respect to the swing surface 2*a*, and the inspection light L2 reflected by the swing surface 2*a* is not incident on the diffraction grating 3.

The second light detection unit 6 includes a second light detector 61A. The second light detector 61A detects the inspection light L2 reflected by the swing surface 2*a*. The second light detector 61A has sensitivity to a wavelength outside the wavelength range of the measurement light L1 (sensitivity of the second light detector 61A to a wavelength within the wavelength range of the measurement light L1 is less than 5% of maximum sensitivity of the second light detector 61A). The second light detection unit 6 has an elongated light receiving region 60 in which a direction D that is a moving direction of the inspection light L2 is a longitudinal direction. The second light detection unit 6 is configured to be able to specify an incident position of the inspection light L2 in the light receiving region 60 in the direction D. The moving direction of the inspection light L2 is a direction in which the incident position of the inspection light L2 in the second light detection unit 6 moves due to a change in the swing angle of the swing surface 2*a*.

The light receiving region 60 is provided in the second light detector 61A. The second light detector 61A includes a plurality of light detection channels aligned in the direction D in the light receiving region 60. In the second light detector 61A, a light receiving surface 61*a* is formed by the plurality of light detection channels. The plurality of light detection channels are configured to be able to output a detection signal for each light detection channel. As an example, the second light detector 61A is an optical semiconductor device made of silicon, and is a line sensor (a sensor having a plurality of pixels (a plurality of light detection channels) aligned in a line in the direction D) having sensitive in the wavelength range in the visible range. As an example, a distance between the swing surface 2*a* and the light receiving region 60 is about several cm, and a width of the light receiving region 60 in the direction D (in the first embodiment, a width of the light receiving surface 61a in the direction D) is about ½ of a distance between the swing surface 2a and the light receiving region 60.

The control unit 7 controls each of the swing element 2, the first light detector 41, the second light detector 61A, and the light source 5. As an example, the control unit 7 includes an integrated circuit such as a field-programmable gate array (FPGA), a nonvolatile memory such as an electrically erasable programmable read-only memory (EEPROM), or the like.

Figure 3:
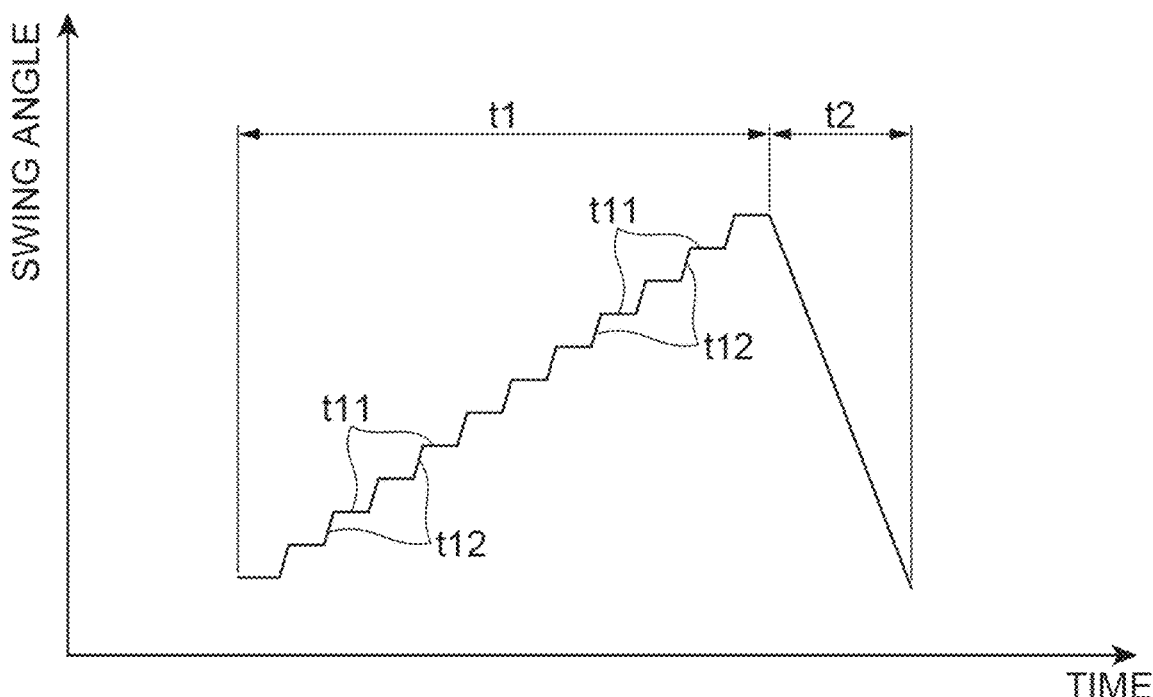
FIG. 3 is a graph representing a relationship between a time and a swing angle of a swing surface.

The control unit 7 controls the swing element 2 to operate in a linear mode (non-resonant drive mode) in a state where the measurement light L1 and the inspection light L2 are incident on the swing surface 2a. Specifically, as illustrated in FIG. 3, the control unit 7 controls the swing element 2 such that the swing angle of the swing surface 2a changes in a first rotation with the axis A as the center line in first time t1 and the swing angle of the swing surface 2a changes in a second rotation opposite to the first rotation with the axis A as the center line and about second time t2 after first time t1. The linear mode is a mode in which the swing angle changes in proportion to magnitude of a current value or a voltage value of a drive signal input to the swing element 2. Only in a case where the swing element 2 is operated in the linear mode, stop time t11, to be described later, in which the swing angle is maintained constant can be provided.

The control unit 7 controls the swing element 2 such that the swing angle of the swing surface 2a changes in a step shape in first time t1. A time during which the swing angle of the swing surface 2a changes in a step shape includes a plurality of stop times t11 during which the swing angle of the swing surface 2a is maintained constant and a plurality of operation times t12 during which the swing angle of the swing surface 2a changes. Stop time t11 and operation time t12 are alternately repeated, for example, about 20 times. Stop time t11 is, for example, about several tens of milliseconds. Operation time t12 during which the swing angle of the swing surface 2a changes is shorter than stop time t11 during which the swing angle of the swing surface 2a is maintained constant. Second time t2 during which the swing angle of the swing surface 2a changes linearly is shorter than first time t1 during which the swing angle of the swing surface 2a changes in a step shape.

The control unit 7 may control the light source 5 such that the inspection light L2 is constantly incident on the swing surface 2a during the operation of the spectroscopic device 1A, but may control the light source 5 such that the inspection light L2 is incident on the swing surface 2a at least in first time t1, or may control the light source 5 such that the inspection light L2 is incident on the swing surface 2a at least in each of the plurality of stop times t11. In a case where a period in which the emission of the inspection light L2 is stopped is provided, it is possible to suppress a decrease in light output of the light source 5. For example, in a case where the light source 5 is formed by the semiconductor laser, the light output of the light source 5 decreases due to self-heating by the light emission, and detection accuracy of the inspection light L2 in the second light detection unit 6 may be degraded. In contrast, by setting the period in which the emission of the inspection light L2 is stopped, it is possible to suppress self-heating due to light emission and maintain the light output of the light source 5 constant. As a result, it is possible to improve the detection accuracy of the inspection light L2 in the second light detection unit 6. Further, the period in which the emission of the inspection light L2 is stopped, energy consumption by the spectroscopic device 1A can be suppressed. In addition, the control unit 7 may control the light incident portion described above such that the measurement light L1 is incident on the swing surface 2a at least in first time t1, or may control the light incident portion described above such that the measurement light L1 is incident on the swing surface 2a at least in each of the plurality of stop times t11.

The control unit 7 controls the first light detector 41 such that the charge is accumulated in each of the plurality of stop times t11 and the charge is read out in each of the plurality of operation times t12. Consequently, the control unit 7 acquires a first detection signal S1 from the first light detector 41 (see FIG. 1). The first detection signal S1 is a signal based on the amount of the charges accumulated in the first light detector 41 in each of the plurality of stop times t11, and the charge is a charge generated by a part of the measurement light L1 incident on the first light detector 41 in each of the plurality of stop times t11.

The control unit 7 controls the swing element 2 such that at least a part of the accumulations of the charges in stop times t11 is performed for each different light detection channel in the second light detection unit 6, and controls the second light detector 61A such that the accumulations of the charges are performed continuously over the plurality of stop times t11 in first time t1 and the readout of the charge is performed in second time t2. That is, the control unit 7 controls the second light detector 61A such that the charge is continuously accumulated over the plurality of stop times t11 and the charge is read out after the plurality of stop times t11. Consequently, the control unit 7 acquires a second detection signal S2 from the second light detector 61A (see FIG. 1). The second detection signal S2 is a signal based on the amount of the charges accumulated in the second light detector 61A in each of the plurality of stop times t11, and the charge is a charge generated by the inspection light L2 incident on the second light detector 61A in each of the plurality of stop times t11.

Figure 4:
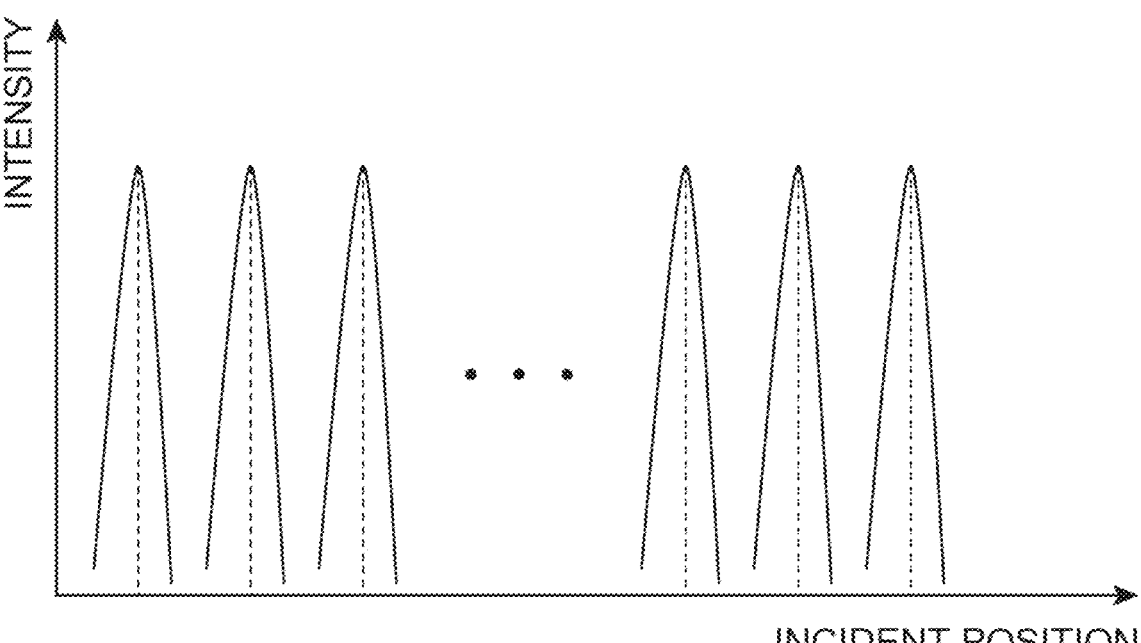
FIG. 4 is a graph representing a relationship between an incident position of inspection light and intensity of a second detection signal.

Since the second light detector 61A has the plurality of light detection channels and the swing angle of the swing surface 2a varies for each stop time t11, as illustrated in FIG. 4, a plurality of peak values appear in the intensity of the second detection signal S2 with respect to the incident position (for example, pixel No.) of the inspection light L2 in the direction D. The incident position of the inspection light L2 corresponding to each of the plurality of peak values indicates the swing angle of the swing surface 2a in each of the plurality of stop times t11. Accordingly, the control unit 7 can calculate data indicating the swing angle of the swing surface 2a in each of the plurality of stop times t11 based on the second detection signal S2. In a case where the charges are accumulated across the plurality of light detection channels (pixels) in one stop time t11, the peak value is calculated by centroid calculation of an intensity value.

Figure 5:
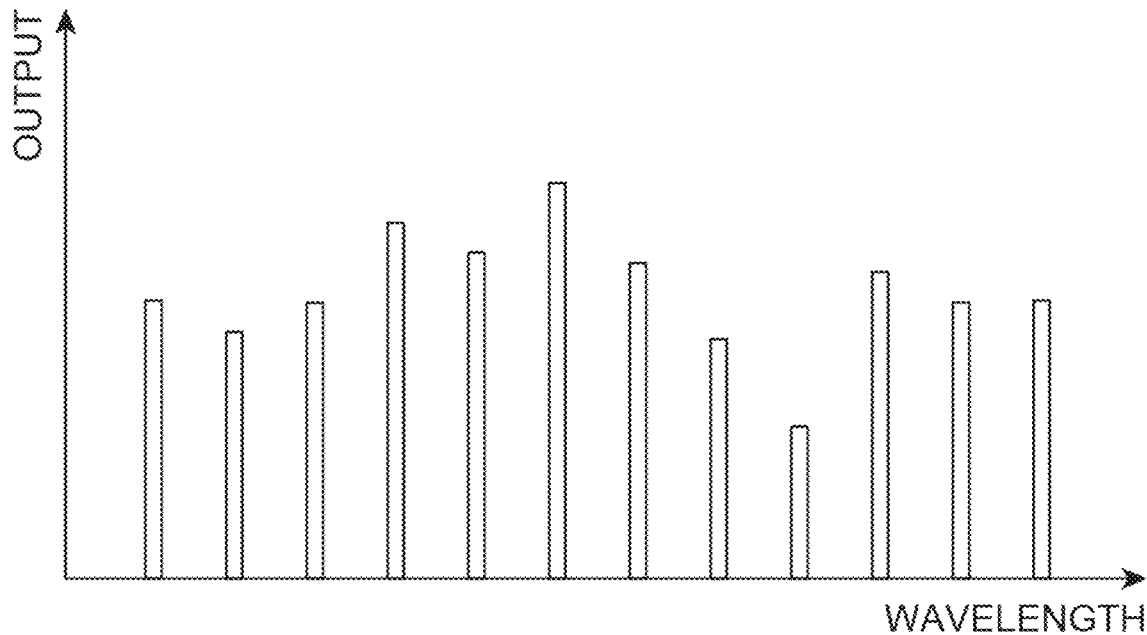
FIG. 5 is a graph representing a spectrum of measurement light.

The control unit 7 generates the data regarding the wavelength of the measurement light L1 based on the first detection signal S1 and the second detection signal S2. Specifically, the control unit 7 generates the data regarding the wavelength of the measurement light L1 based on the first detection signal S1, the data indicating the swing angle of the swing surface 2a in each of the plurality of stop times t11 (data calculated based on the second detection signal S2) and the data indicating the correspondence relationship between the swing angle of the swing surface 2a and the wavelength of the light incident on the first light detector 41. As an example, the data regarding the wavelength of the measurement light L1 is data indicating the spectrum of the measurement light L1 (a component of the measurement light L1 is decomposed for each wavelength) as illustrated in FIG. 5. The control unit 7 may acquire in advance the data indicating the correspondence relationship between the incident position of the inspection light L2 in the direction D and the wavelength of the light incident on the first light detector 41, and may generate the data regarding the wavelength of the measurement light L1 based on the first detection signal S1 and the second detection signal S2 without calculating the data indicating the swing angle of the swing surface 2a based on the second detection signal S2.

As described above, in the spectroscopic device 1A, the light source 5 emits the inspection light L2 to be incident on the swing surface 2a of the swing element 2, and the second light detector 61A detects the inspection light L2 reflected by the swing surface 2a. The second light detection unit 6 including the second light detector 61A has the elongated light receiving region 60 in which the direction D that is the moving direction of the inspection light L2 is the longitudinal direction. Accordingly, the incident position of the inspection light L2 in the light receiving region 60 can be specified in the direction D, and based on the data indicating the incident position of the inspection light L2 in the light receiving region 60, for example, the data indicating the swing angle of the swing surface 2a when the first light detector 41 detects a part of the measurement light L1 can be accurately acquired. Accordingly, according to the spectroscopic device 1A, the data regarding the wavelength of the measurement light L1 can be acquired with high accuracy.

In a case where the light source 5 that emits the inspection light L2 is used, it is advantageous in the following points. For example, when a part of the measurement light L1 is branched by using a beam splitter and the part of the measurement light L1 is used as the inspection light, since the intensity of the measurement light L1 is not constantly constant, in a case where the intensity of the measurement light L1 is small, the incident position of the inspection light L2 in the light receiving region 60 may not be able to be accurately specified in the direction D. This means that the data indicating the swing angle of the swing surface 2a cannot be acquired with high accuracy, and accordingly, the data regarding the wavelength of the measurement light L1 cannot be acquired with high accuracy. In contrast, when the light source 5 that emits the inspection light L2 is used, since the intensity of the inspection light L2 emitted from the light source 5 can be maintained constant, the incident position of the inspection light L2 in the light receiving region 60 can accurately be specified in the direction D, and accordingly, the data regarding the wavelength of the measurement light L1 can accurately be acquired.

A case where the elongated light receiving region 60 in which the direction D that is the moving direction of the inspection light L2 is the longitudinal direction is provided in the second light detection unit 6 is advantageous in that the width of the light receiving region 60 in the direction perpendicular to the direction D can be reduced while a maximum value of the swing angle of the swing surface 2a is sufficiently secured and the second light detection unit 6 can be thinned.

In a case where the light source 5 and the second light detection unit 6 are used, it is advantageous in the following points to acquire the data indicating the swing angle of the swing surface 2a. As an example, a method for providing an electromotive force sensor (coil) in the movable portion 22 of the swing element 2, detecting a swing speed of the movable portion 22 based on a current generated in the electromotive force sensor when the movable portion 22 swings, and acquiring the data indicating the swing angle of the swing surface 2a based on the swing speed of the movable portion 22 is known. In addition, a method for providing a piezoelectric sensor (piezoelectric element) at or near the coupling portion 23 of the swing element 2 and acquiring the data indicating the swing angle of the swing surface 2a based on a voltage generated in the piezoelectric sensor when the movable portion swings is known. However, these methods have a problem that an output value from the sensor fluctuates even though the swing angle of the swing surface 2a is the same due to, for example, a change in environmental temperature, self-heating of the sensor (coil or piezoelectric element) at the time of driving, and the like. A method for correcting an output value from a sensor by using a temperature sensor or the like is also known, but this method has a problem that circuit design becomes complicated. In particular, in a case where the swing element 2 is operated in the linear mode, the output value from the electromotive force sensor (coil) decreases as compared with a case where the swing element 2 is operated in the resonance mode, and there is a problem that it is difficult to accurately acquire the data indicating the swing angle of the swing surface 2a. On the other hand, according to the spectroscopic device 1A, the data indicating the swing angle of the swing surface 2a can be directly and accurately acquired by using the light source 5 and the second light detection unit 6.

In the spectroscopic device 1A, the diffraction grating 3 is disposed at a position away from the swing surface 2a. Consequently, it is possible to improve a degree of freedom in manufacturing the diffraction grating 3 while facilitating the manufacturing of the swing element 2. In addition, it is possible to suppress an increase in size of the swing element 2 and to suppress an increase in moment of inertia accompanying an increase in mass of the movable portion 22.

In the spectroscopic device 1A, the control unit 7 controls the swing element 2 such that the swing angle of the swing surface 2a changes in a step shape, acquires the first detection signal S1 based on the amount of the charges accumulated in the first light detector 41 in each of the plurality of stop times t11 and the second detection signal S2 based on the amount of the charges accumulated in the second light detector 61A in each of the plurality of stop times t11, and generates the data regarding the wavelength of the measurement light L1 based on the first detection signal S1 and the second detection signal S2. Consequently, since the swing angle is maintained constant in each stop time t11, it is possible to increase a signal amount by securing an accumulation time of the charge in each of the first light detector 41 and the second light detector 61A for each different swing angle. As a result, since the S/N ratio is improved, the data regarding the wavelength of the measurement light L1, such as data indicating the spectrum of the measurement light L1, can be generated with high accuracy. In particular, since the measurement light L1 is dispersed by the diffraction grating 3, a light amount of the measurement light L1 detected by the first light detector 41 tends to be weak. Accordingly, the above configuration that can increase the signal amount by securing the accumulation time of the charge in the first light detector 41 is effective. In addition, for example, in a case where the measurement light L1 is light in the mid-infrared range, the measurement light L1 tends to be weak light as compared with a case where the measurement light L1 is the light in the visible range, and in general, the sensitivity of the light detector to the light in the mid-infrared range is often lower than the sensitivity of the light detector to the light in the visible range. Accordingly, the above configuration is extremely effective in such a case.

In the spectroscopic device 1A, the control unit 7 controls the swing element 2 such that the swing angle of the swing surface 2a changes in a first rotation with the axis A as the center line in first time t1 and the swing angle of the swing surface 2a changes in a second rotation opposite to the first rotation with the axis A as the center line in second time t2 after first time t1. Consequently, the data regarding the wavelength of the measurement light L1 can be acquired in order of shorter wavelength or in order of higher wavelength.

In the spectroscopic device 1A, the control unit 7 controls the swing element 2 such that the swing angle of the swing surface 2a changes in a step shape in first time t1. Consequently, the data regarding the wavelength of the measurement light L1 can be efficiently generated.

In the spectroscopic device 1A, first time t1 during which the swing angle changes in a step shape is longer than second time t2. Consequently, the number of stop times t11 during which the swing angle is maintained constant is increased, and the wavelength resolution when the data regarding the wavelength of the measurement light L1 is acquired can be improved. In addition, for example, in a case where the swing element 2 is a MEMS device, minute vibration may occur on the swing surface 2a due to sudden stop of the swing surface 2a immediately after the start of each stop time t11. In such a case, a sufficient length of stop time t11 is secured, and thus, it is possible to accumulate the charge in each of the first light detector 41 and the second light detector 61A in a state where the minute vibration of the swing surface 2a is settled. As a result, it is possible to generate the data regarding the wavelength of the measurement light L1 with higher accuracy.

In the spectroscopic device 1A, the second light detector 61A has the plurality of light detection channels aligned in the direction D, and the control unit 7 controls the swing element 2 such that at least a part of the accumulations of the charges in stop times t11 are performed for different light detection channels, and controls the second light detector 61A such that the accumulations of the charges are performed continuously over the plurality of stop times t11 and the readout of the charge is performed after the plurality of stop times t11. Consequently, since the numbers of times of reading out the charges in first time t1 and second time t2 of one cycle are reduced, a processing load of the control unit 7 can be reduced.

In the spectroscopic device 1A, the control unit 7 controls the swing element 2 such that the swing angle of the swing surface 2a changes in a step shape in first time t1, and controls the second light detector 61A such that the accumulations of the charges are performed continuously over the plurality of stop times t11 in first time t1 and the readout of the charge is performed in second time t2. Consequently, since the numbers of times of reading out the charges in first time t1 and second time t2 of one cycle become one, the processing load of the control unit 7 can be reduced.

In the spectroscopic device 1A, the light receiving region 60 is provided in the second light detector 61A, and the second light detector 61A has the plurality of light detection channels aligned in the direction D in the light receiving region 60. Consequently, the configuration of the second light detection unit 6 can be simplified. Specifically, since it is not necessary to provide an optical member such as a condenser lens in front of the second light detector 61A, the configuration of the second light detection unit 6 can be simplified, and the spectroscopic device 1A can be downsized. In particular, in a case where the swing element 2 is a MEMS device, downsizing of the spectroscopic device 1A becomes more important, and alignment between the plurality of optical members becomes more severe. Accordingly, a configuration in which it is not necessary to provide an optical member such as a condenser lens in front of the second light detector 61A is extremely effective. When the second light detector 61A including the plurality of light detection channels is used, the incident position of the inspection light L2 in the light receiving region 60 can accurately be specified in the direction D regardless of the intensity of the inspection light L2 emitted from the light source 5.

In the spectroscopic device 1A, the inspection light L2 has a center wavelength outside the wavelength range of the measurement light L1. Consequently, the measurement light L1 can be prevented from becoming the noise in the detection of the inspection light L2. In a case where the inspection light L2 is the laser beam, since a beam diameter of the inspection light L2 can be maintained small in the light receiving region 60, the position resolution when the incident position of the inspection light L2 in the light receiving region 60 is specified in the direction D can be improved, and the angular resolution when the data indicating the swing angle of the swing surface 2a can be improved.

In the spectroscopic device 1A, the second light detector 61A has sensitivity to the wavelength outside the wavelength range of the measurement light L1. Consequently, the measurement light L1 can be prevented from becoming the noise in the detection of the inspection light L2.

As viewed from the direction parallel to the axis A, the spectroscopic device 1A is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1A is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

In the spectroscopic device 1A, the control unit 7 may control the second light detector 61A such that the charge is accumulated in each of the plurality of stop times t11 and the charge is read out in each of the plurality of operation times t12, and may acquire the second detection signal S2 indicating the intensity in each of the plurality of stop times t11 from the second light detector 61A. In this case, for example, the swing angle of the swing surface 2a can be changed in a step shape while finely adjusting the swing angle of the swing surface 2a based on the second detection signal S2. In addition, for example, the swing angle of the swing surface 2a is adjusted to a desired swing angle based on the second detection signal S2, and data regarding a desired wavelength included in the measurement light L1 can be acquired.

Second Embodiment

Figure 6:
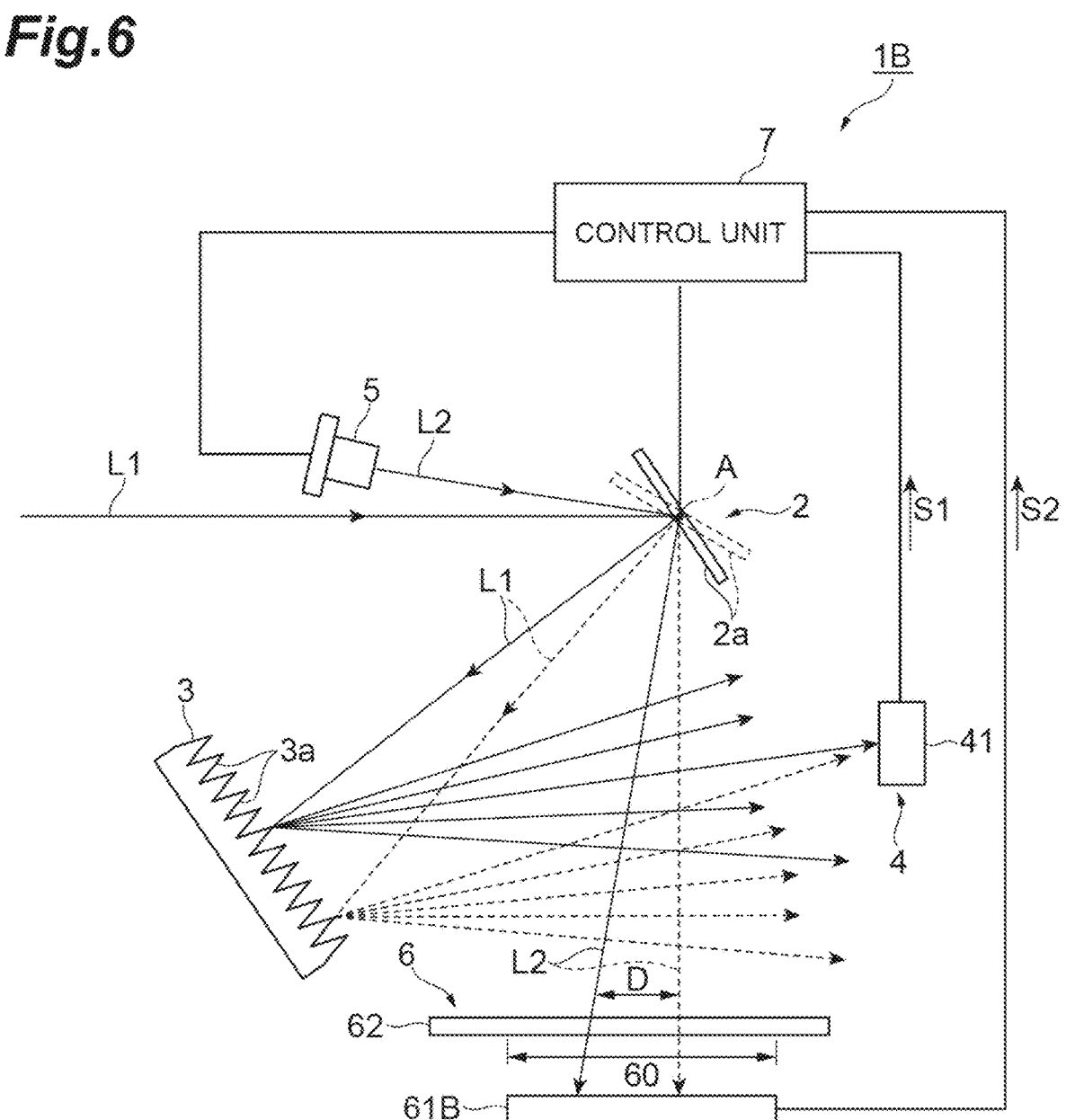
FIG. 6 is a configuration diagram of a spectroscopic device according to a second embodiment.

As illustrated in FIG. 6, a spectroscopic device 1B according to a second embodiment is mainly different from the spectroscopic device 1A according to the first embodiment in the configuration of the second light detection unit 6. A configuration of the spectroscopic device 1B excluding the second light detection unit 6 is the same as the configuration of the spectroscopic device 1A.

The second light detection unit 6 of the spectroscopic device 1B includes a filter (first optical member) 62 and a second light detector 61B. The filter 62 is disposed on an optical path between the swing surface 2a and the second light detector 61B. The elongated light receiving region 60 in which the direction D that is the moving direction of the inspection light L2 is the longitudinal direction is provided in the filter 62. The second light detector 61B has a single light detection channel. That is, the second light detector 61B outputs the second detection signal S2 based on the amount of the charges accumulated in the entire second light detector 61B regardless of the incident position of the inspection light L2 in the second light detector 61B. Thus, the control unit 7 controls the second light detector 61B such that the charge is accumulated in each of the plurality of stop times t11 and the charge is read out in each of the plurality of operation times t12, and acquires the second detection signal S2 indicating the intensity in each of the plurality of stop times t11 from the second light detector 61B.

Figure 7:
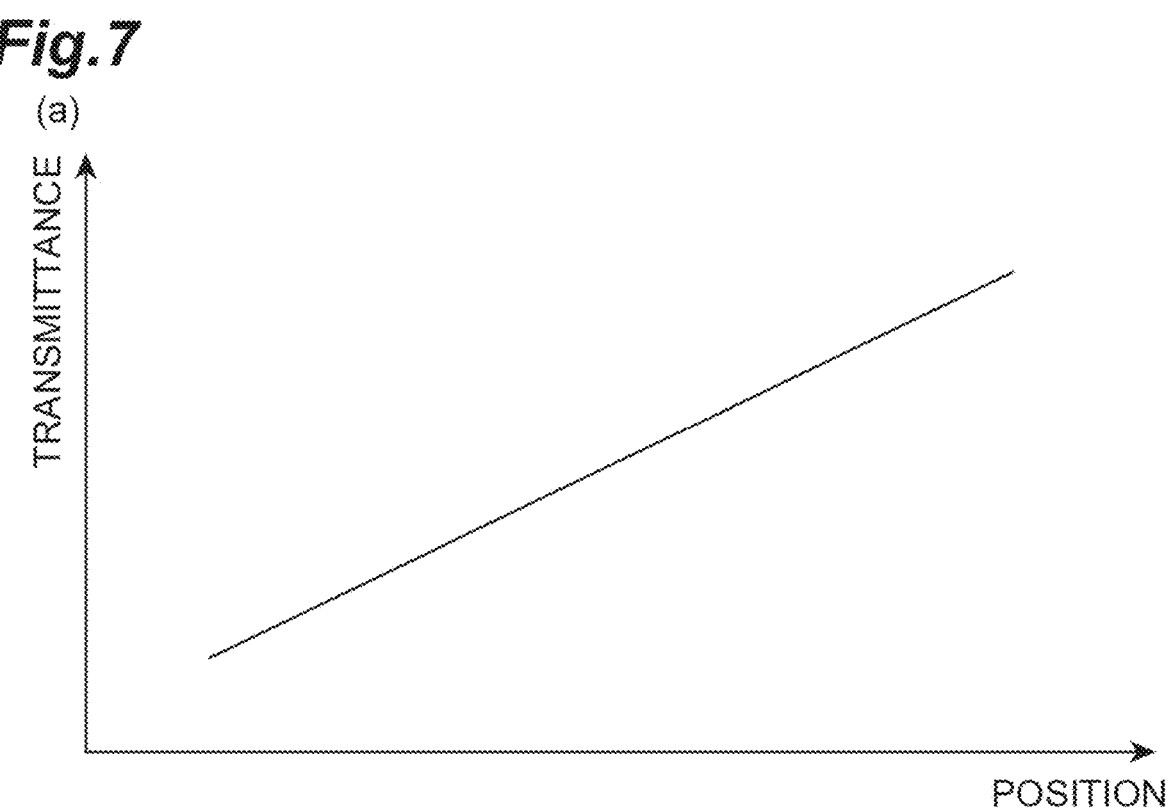
FIG. 7 is a graph representing a relationship between a position in a filter and a transmittance of the filter and a relationship between a swing angle of a swing surface and intensity of a second detection signal.
Figure 7:
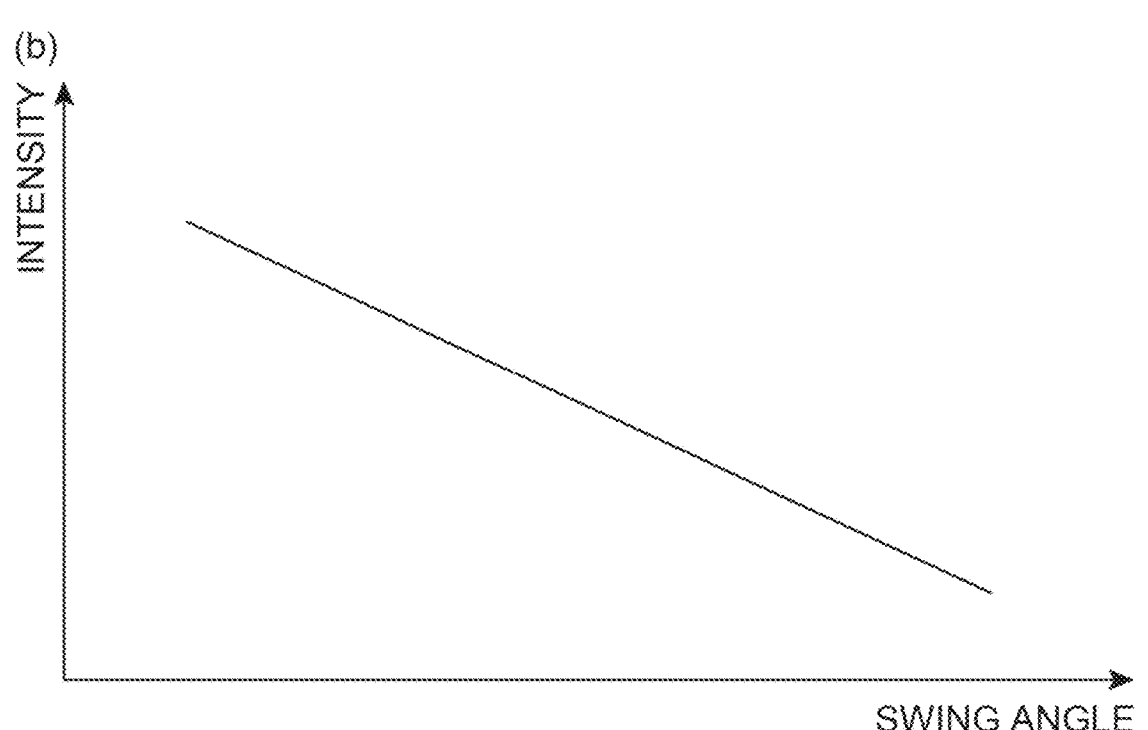

In the filter 62, as illustrated in (a) of FIG. 7, a transmittance of the inspection light L2 in the light receiving region 60 changes (increases in the example illustrated in (a) of FIG. 7) in accordance with a position in the direction D. Thus, the intensity of the second detection signal S2 output from the second light detector 61B changes in accordance with the incident position of the inspection light L2 on the filter 62. That is, the intensity of the second detection signal S2 output from the second light detector 61B changes in accordance with the swing angle of the swing surface 2a as illustrated in (b) of FIG. 7 (decreases in the example illustrated in (b) of FIG. 7). Accordingly, the control unit 7 can calculate data indicating the swing angle of the swing surface 2a in each of the plurality of stop times t11 based on the second detection signal S2.

Similarly to the first embodiment, the control unit 7 generates the data regarding the wavelength of measurement light L1 based on the first detection signal S1 and the second detection signal S2. Specifically, the control unit 7 generates the data regarding the wavelength of the measurement light L1 based on the first detection signal S1, the data indicating the swing angle of the swing surface 2a in each of the plurality of stop times t11 (data calculated based on the second detection signal S2) and the data indicating the correspondence relationship between the swing angle of the swing surface 2a and the wavelength of the light incident on the first light detector 41. The control unit 7 may acquire in advance data indicating a correspondence relationship between the intensity of the second detection signal S2 and the wavelength of the light incident on the first light detector 41, and may generate the data regarding the wavelength of the measurement light L1 based on the first detection signal S1 and the second detection signal S2 without calculating the data indicating the swing angle of the swing surface 2a based on the second detection signal S2.

As described above, similarly to the spectroscopic device 1A, according to the spectroscopic device 1B, the data regarding the wavelength of the measurement light L1 can be accurately acquired.

In particular, in a case where the second light detector 61B having the single light detection channel is used, it is advantageous in the following points to use the light source 5 that emits the inspection light L2. As a premise, in a case where the second light detector 61B having the single light detection channel is used, the incident position of the inspection light L2 in the light receiving region 60 is specified in the direction D based on the intensity of the second detection signal S2 output from the second light detector 61B. Here, for example, when a part of the measurement light L1 is branched by using a beam splitter and the part of the measurement light L1 is used as the inspection light, the intensity of the second detection signal S2 output from the second light detector 61B depends on the intensity of the measurement light L1 which is not constantly constant. This means that the above-described premise (that is, the incident position of the inspection light L2 in the light receiving region 60 is specified in the direction D based on the intensity of the second detection signal S2) is not established. In contrast, in a case where the second light detector 61B having the single light detection channel is used, when the light source 5 that emits the inspection light L2 is used, since the intensity of the inspection light L2 emitted from the light source 5 can be maintained constant, the incident position of the inspection light L2 in the light receiving region 60 can be accurately specified in the direction D based on the intensity of the second detection signal S2, and accordingly, the data regarding the wavelength of the measurement light L1 can be accurately acquired.

In the spectroscopic device 1B, the control unit 7 controls the second light detector 61B such that the charge is accumulated in each of the plurality of stop times t11 and the charge is read out in each of the plurality of operation times t12. Consequently, for example, the swing angle of the swing surface 2a can be changed in a step shape while finely adjusting the swing angle of the swing surface 2a based on the second detection signal S2. In addition, for example, the swing angle of the swing surface 2a is adjusted to a desired swing angle based on the second detection signal S2, and data regarding a desired wavelength included in the measurement light L1 can be acquired.

In the spectroscopic device 1B, the light receiving region 60 is provided in the filter 62, and in the filter 62, a transmittance of the inspection light L2 in the light receiving region 60 changes in accordance with the position in the direction D. Consequently, a configuration of a readout circuit of the second light detector 61B can be simplified.

In the spectroscopic device 1B, the second light detector 61B has a single light detection channel. Consequently, a configuration of a readout circuit of the second light detector 61B can be simplified. The second light detector 61B may have a plurality of light detection channels, and in this case, the control unit 7 may acquire, as the second detection signal S2, a total value of signals output from the plurality of light detection channels.

As viewed from the direction parallel to the axis A, the spectroscopic device 1B is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1B is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Third Embodiment

Figure 8:
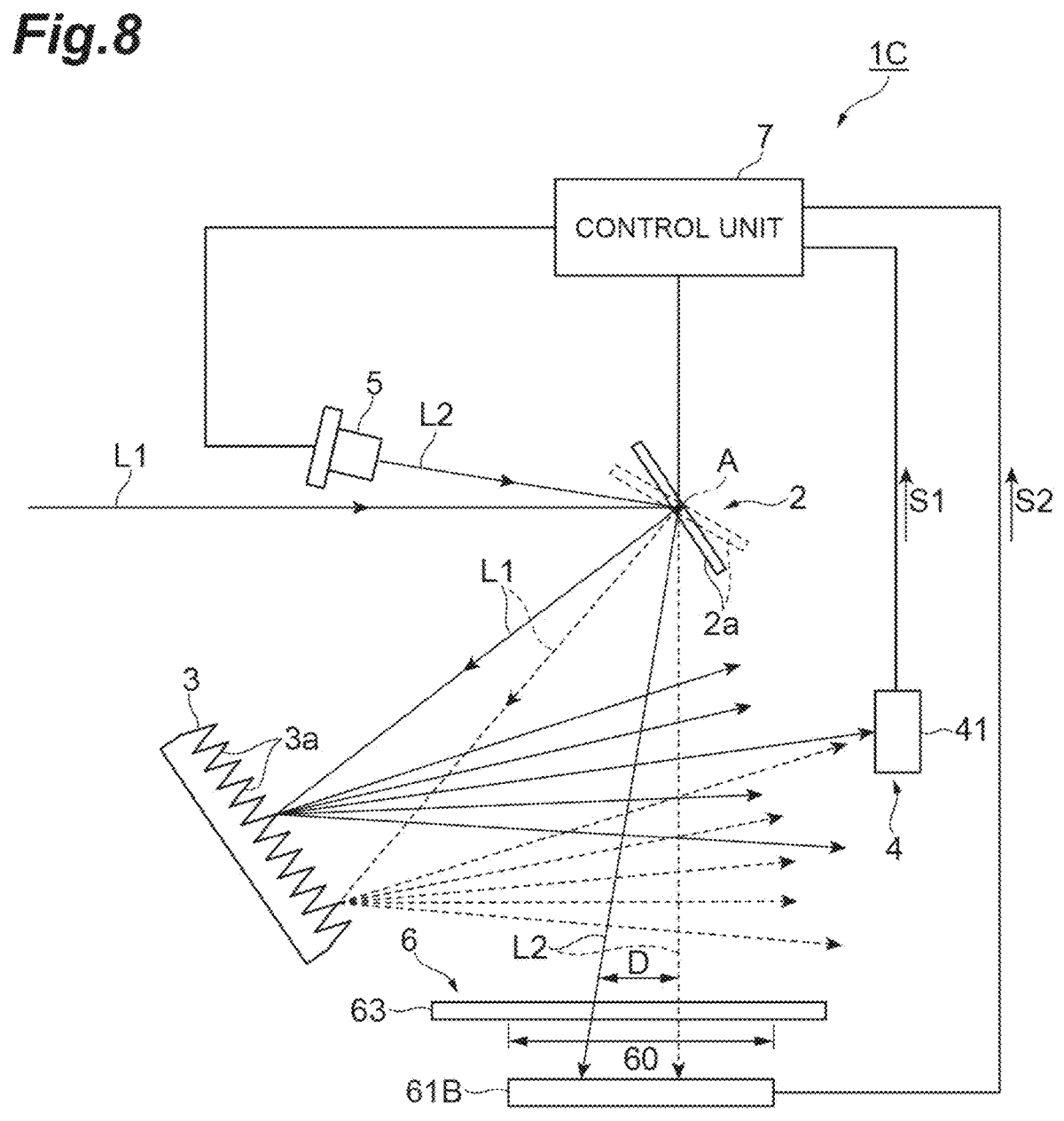

As illustrated in FIG. 8, a spectroscopic device 1C according to a third embodiment is mainly different from the spectroscopic device 1A according to the first embodiment in the configuration of the second light detection unit 6. A configuration of the spectroscopic device 1C excluding the second light detection unit 6 is the same as the configuration of the spectroscopic device 1A.

The second light detection unit 6 of the spectroscopic device 1C includes a slit member (first optical member) 63 and a second light detector 61B. The slit member 63 is disposed on an optical path between the swing surface 2a and the second light detector 61B. The elongated light receiving region 60 in which the direction D that is the moving direction of the inspection light L2 is the longitudinal direction is provided in the slit member 63. The second light detector 61B has a single light detection channel. That is, the second light detector 61B outputs the second detection signal S2 based on the amount of the charges accumulated in the entire second light detector 61B regardless of the incident position of the inspection light L2 in the second light detector 61B. Thus, the control unit 7 controls the second light detector 61B such that the charge is accumulated in each of the plurality of stop times t11 and the charge is read out in each of the plurality of operation times t12, and acquires the second detection signal S2 indicating the intensity in each of the plurality of stop times t11 from the second light detector 61B.

Figure 9:
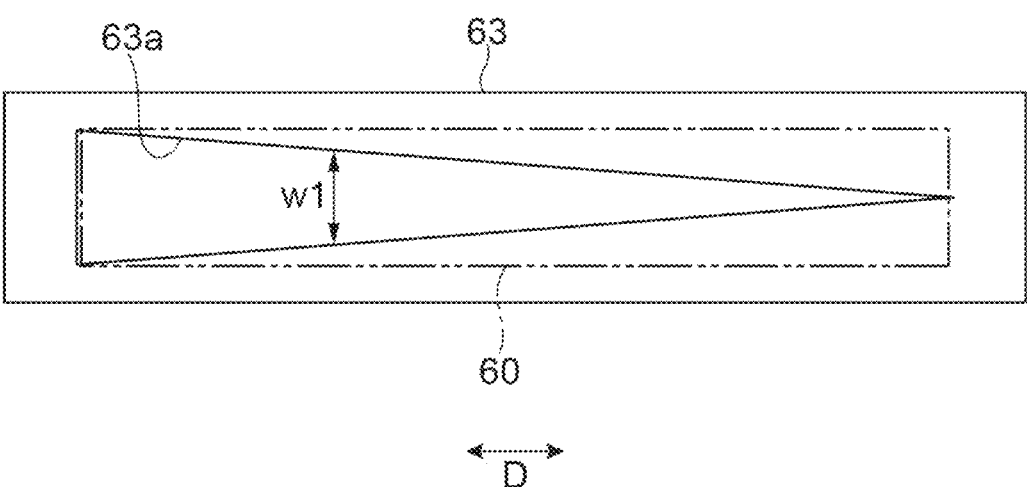
FIG. 9 is a plan view of a slit member illustrated in FIG. 8.
Figure 10:
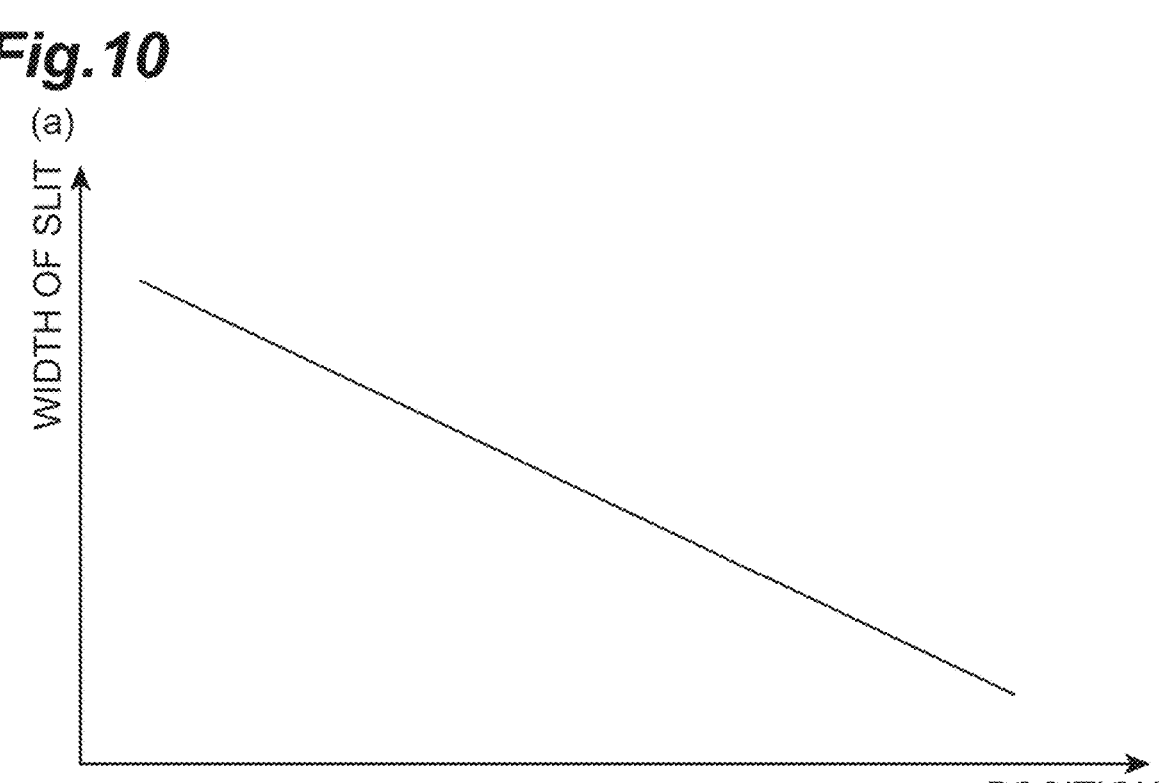
FIG. 10 is a graph representing a relationship between a position in a slit and a width of the slit and a relationship between a swing angle of a swing surface and intensity of a second detection signal.
Figure 10:
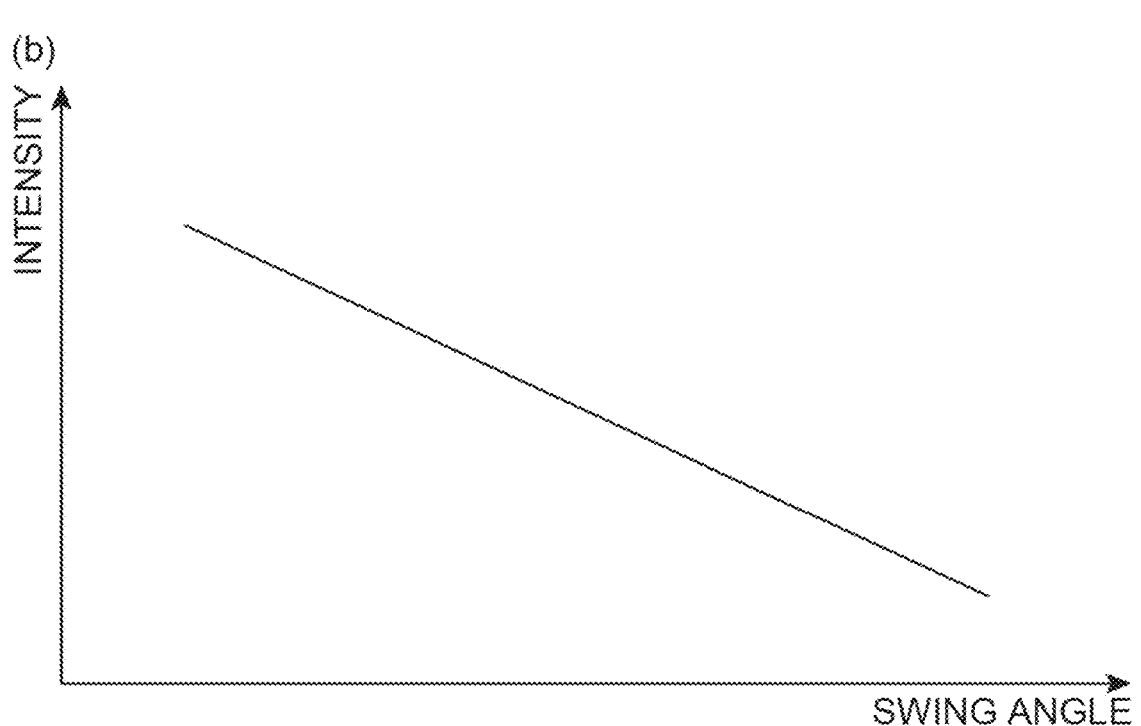

As illustrated in FIG. 9, the slit member 63 has a slit 63a extending in the direction D in the light receiving region 60. As illustrated in FIG. 9 and (a) of FIG. 10, a width w1 of the slit 63a in the direction perpendicular to the direction D changes in accordance with the position in the direction D (decreases in the example illustrated in (a) of FIG. 10). Thus, the intensity of the second detection signal S2 output from the second light detector 61B changes in accordance with the incident position of the inspection light L2 in the slit 63a. That is, the intensity of the second detection signal S2 output from the second light detector 61B changes in accordance with the swing angle of the swing surface 2a as illustrated in (b) of FIG. 10 (decreases in the example illustrated in (b) of FIG. 10). Accordingly, the control unit 7 can calculate data indicating the swing angle of the swing surface 2a in each of the plurality of stop times t11 based on the second detection signal S2.

Similarly to the first embodiment, the control unit 7 generates the data regarding the wavelength of measurement light L1 based on the first detection signal S1 and the second detection signal S2. Specifically, the control unit 7 generates the data regarding the wavelength of the measurement light L1 based on the first detection signal S1, the data indicating the swing angle of the swing surface 2a in each of the plurality of stop times t11 (data calculated based on the second detection signal S2) and the data indicating the correspondence relationship between the swing angle of the swing surface 2a and the wavelength of the light incident on the first light detector 41. The control unit 7 may acquire in advance data indicating a correspondence relationship between the intensity of the second detection signal S2 and the wavelength of the light incident on the first light detector 41, and may generate the data regarding the wavelength of the measurement light L1 based on the first detection signal S1 and the second detection signal S2 without calculating the data indicating the swing angle of the swing surface 2a based on the second detection signal S2.

As described above, similarly to the spectroscopic device 1A, according to the spectroscopic device 1C, the data regarding the wavelength of the measurement light L1 can be accurately acquired.

In the spectroscopic device 1C, the control unit 7 controls the second light detector 61B such that the charge is accumulated in each of the plurality of stop times t11 and the charge is read out in each of the plurality of operation times t12. Consequently, for example, the swing angle of the swing surface 2a can be changed in a step shape while finely adjusting the swing angle of the swing surface 2a based on the second detection signal S2. In addition, for example, the swing angle of the swing surface 2a is adjusted to a desired swing angle based on the second detection signal S2, and data regarding a desired wavelength included in the measurement light L1 can be acquired.

In the spectroscopic device 1C, the light receiving region 60 is provided in the slit member 63, and in the slit member 63, the width of the slit 63a changes in accordance with the position in the direction D. Consequently, a configuration of a readout circuit of the second light detector 61B can be simplified.

In the spectroscopic device 1C, the second light detector 61B has a single light detection channel. Consequently, a configuration of a readout circuit of the second light detector 61B can be simplified. The second light detector 61B may have a plurality of light detection channels, and in this case, the control unit 7 may acquire, as the second detection signal S2, a total value of signals output from the plurality of light detection channels.

As viewed from the direction parallel to the axis A, the spectroscopic device 1C is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1C is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Fourth Embodiment

Figure 11:
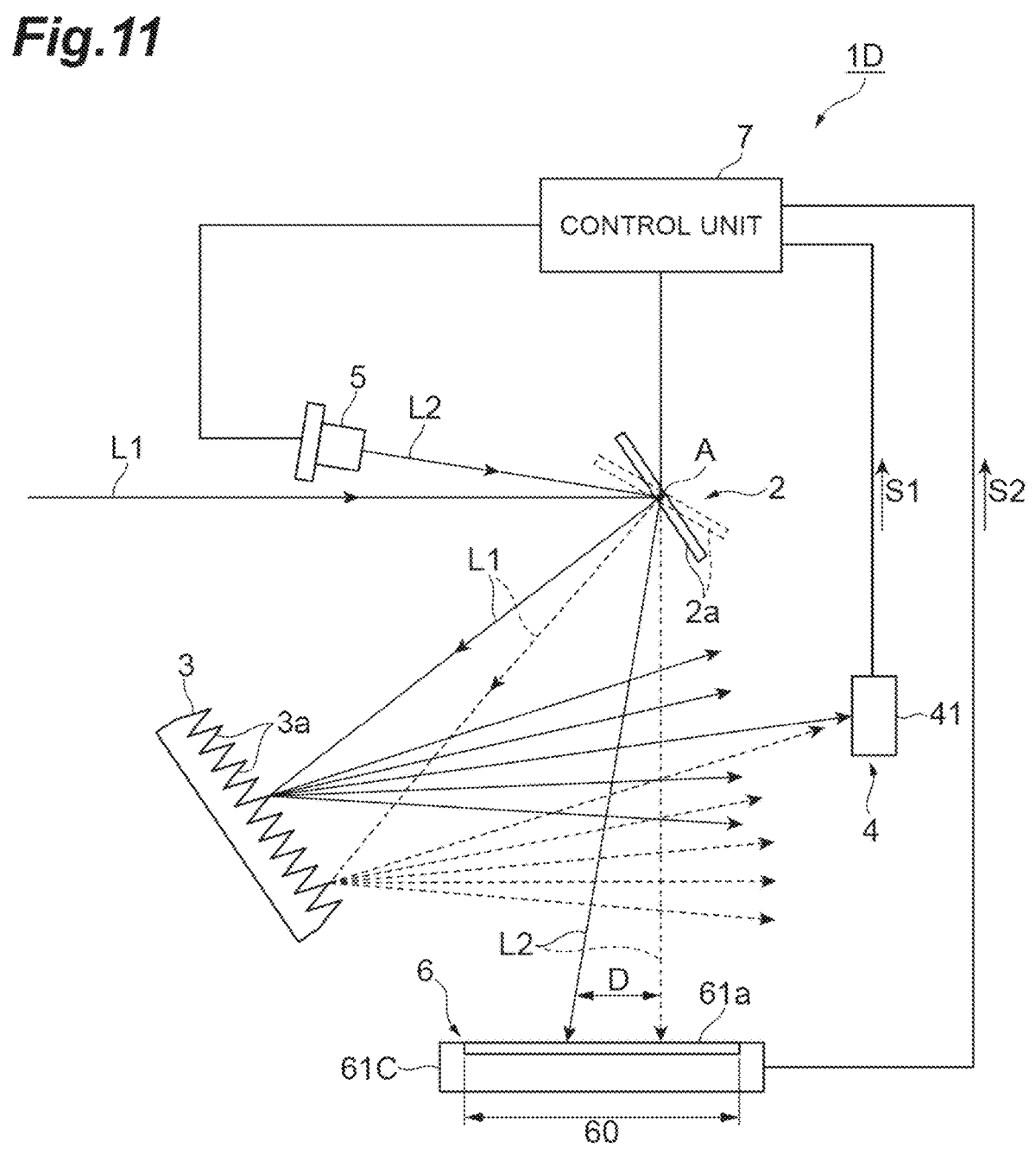

As illustrated in FIG. 11, a spectroscopic device 1D according to a fourth embodiment is mainly different from the spectroscopic device 1A according to the first embodiment in the configuration of the second light detection unit 6. A configuration of the spectroscopic device 1D excluding the second light detection unit 6 is the same as the configuration of the spectroscopic device 1A.

The second light detection unit 6 of the spectroscopic device 1D includes a second light detector 61C. The elongated light receiving region 60 in which the direction D that is the moving direction of the inspection light L2 is the longitudinal direction is provided in the second light detector 61C. The second light detector 61C has a single light detection channel. That is, the second light detector 61C outputs the second detection signal S2 based on the amount of the charges accumulated in the entire second light detector 61C regardless of the incident position of the inspection light L2 in the second light detector 61C. Thus, the control unit 7 controls the second light detector 61C such that the charge is accumulated in each of the plurality of stop times t11 and the charge is read out in each of the plurality of operation times t12, and acquires the second detection signal S2 indicating the intensity in each of the plurality of stop times t11 from the second light detector 61C.

Figure 12:
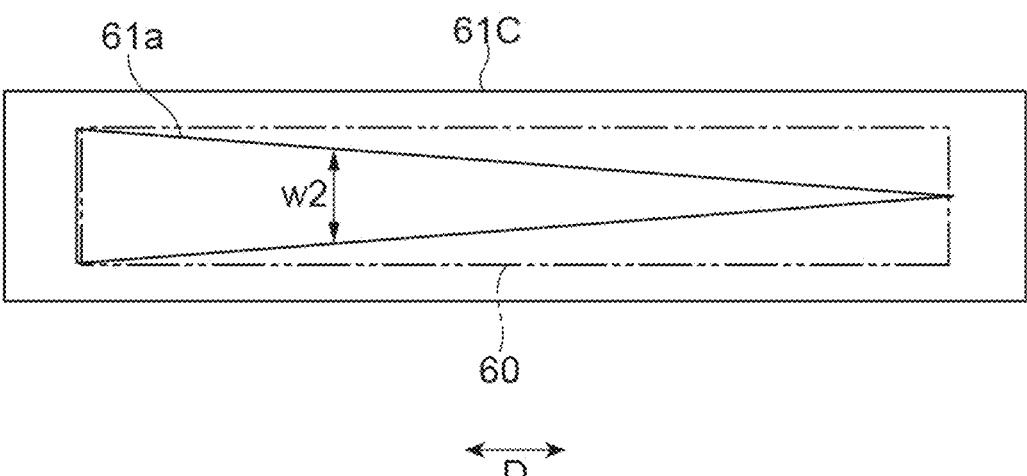
FIG. 12 is a plan view of a second light detector illustrated in FIG. 11.
Figure 13:
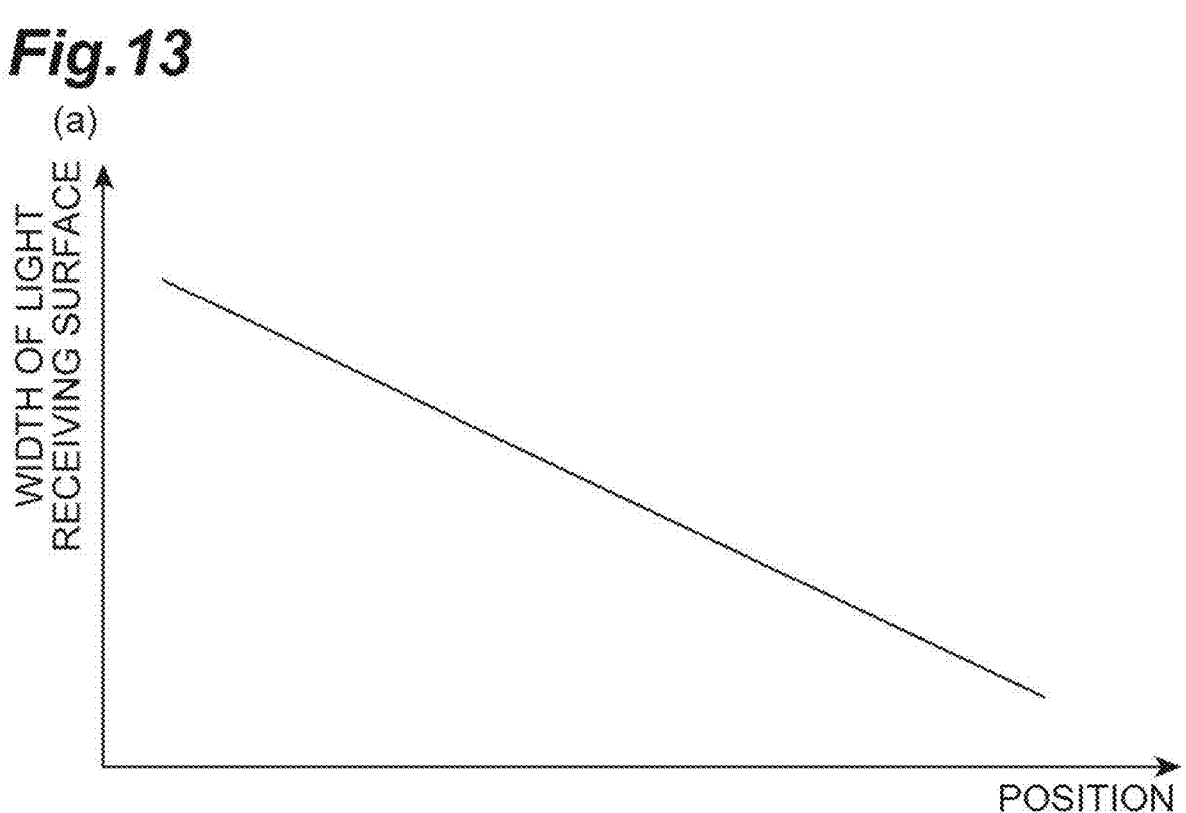
FIG. 13 is a graph representing a relationship between a position on a light receiving surface and a width of the light receiving surface and a relationship between a swing angle of a swing surface and intensity of a second detection signal.
Figure 13:
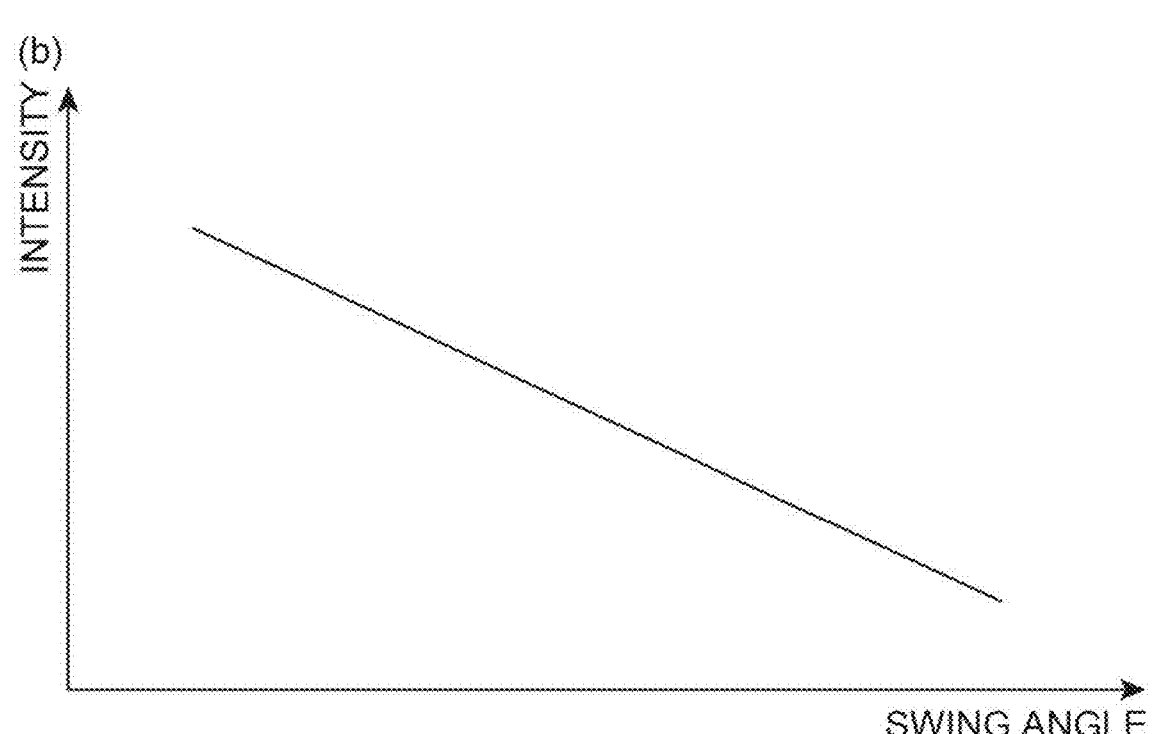

As illustrated in FIG. 12, the second light detector 61C has a light receiving surface 61a extending in the direction D in the light receiving region 60. As illustrated in FIG. 12 and (a) of FIG. 13, a width w2 of the light receiving surface 61a in the direction perpendicular to the direction D changes in accordance with the position in the direction D (decreases in the example illustrated in (a) of FIG. 13). Thus, the intensity of the second detection signal S2 output from the second light detector 61C changes in accordance with the incident position of the inspection light L2 on the light receiving surface 61a. That is, the intensity of the second detection signal S2 output from the second light detector 61C changes in accordance with the swing angle of the swing surface 2a as illustrated in (b) of FIG. 13 (decreases in the example illustrated in (b) of FIG. 13). Accordingly, the control unit 7 can calculate data indicating the swing angle of the swing surface 2a in each of the plurality of stop times t11 based on the second detection signal S2.

Similarly to the first embodiment, the control unit 7 generates the data regarding the wavelength of measurement light L1 based on the first detection signal S1 and the second detection signal S2. Specifically, the control unit 7 generates the data regarding the wavelength of the measurement light L1 based on the first detection signal S1, the data indicating the swing angle of the swing surface 2a in each of the plurality of stop times t11 (data calculated based on the second detection signal S2) and the data indicating the correspondence relationship between the swing angle of the swing surface 2a and the wavelength of the light incident on the first light detector 41. The control unit 7 may acquire in advance data indicating a correspondence relationship between the intensity of the second detection signal S2 and the wavelength of the light incident on the first light detector 41, and may generate the data regarding the wavelength of the measurement light L1 based on the first detection signal S1 and the second detection signal S2 without calculating the data indicating the swing angle of the swing surface 2a based on the second detection signal S2.

As described above, similarly to the spectroscopic device 1A, according to the spectroscopic device 1D, the data regarding the wavelength of the measurement light L1 can be accurately acquired.

In the spectroscopic device 1D, the control unit 7 controls the second light detector 61C such that the charge is accumulated in each of the plurality of stop times t11 and the charge is read out in each of the plurality of operation times t12. Consequently, for example, the swing angle of the swing surface 2a can be changed in a step shape while finely adjusting the swing angle of the swing surface 2a based on the second detection signal S2. In addition, for example, the swing angle of the swing surface 2a is adjusted to a desired swing angle based on the second detection signal S2, and data regarding a desired wavelength included in the measurement light L1 can be acquired.

In the spectroscopic device 1D, the light receiving region 60 is provided in the second light detector 61C, the second light detector 61C has the light receiving surface 61a extending in the direction D in the light receiving region 60, and the width w2 of the light receiving surface 61a changes in accordance with the position in the direction D. Consequently, a configuration of a readout circuit of the second light detector 61C can be simplified.

In the spectroscopic device 1D, the second light detector 61C has a single light detection channel. Consequently, a configuration of a readout circuit of the second light detector 61C can be simplified. The second light detector 61C may have a plurality of light detection channels, and in this case, the control unit 7 may acquire, as the second detection signal S2, a total value of the signals output from the plurality of light detection channels.

As viewed from the direction parallel to the axis A, the spectroscopic device 1D is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1D is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Fifth Embodiment

Figure 14:
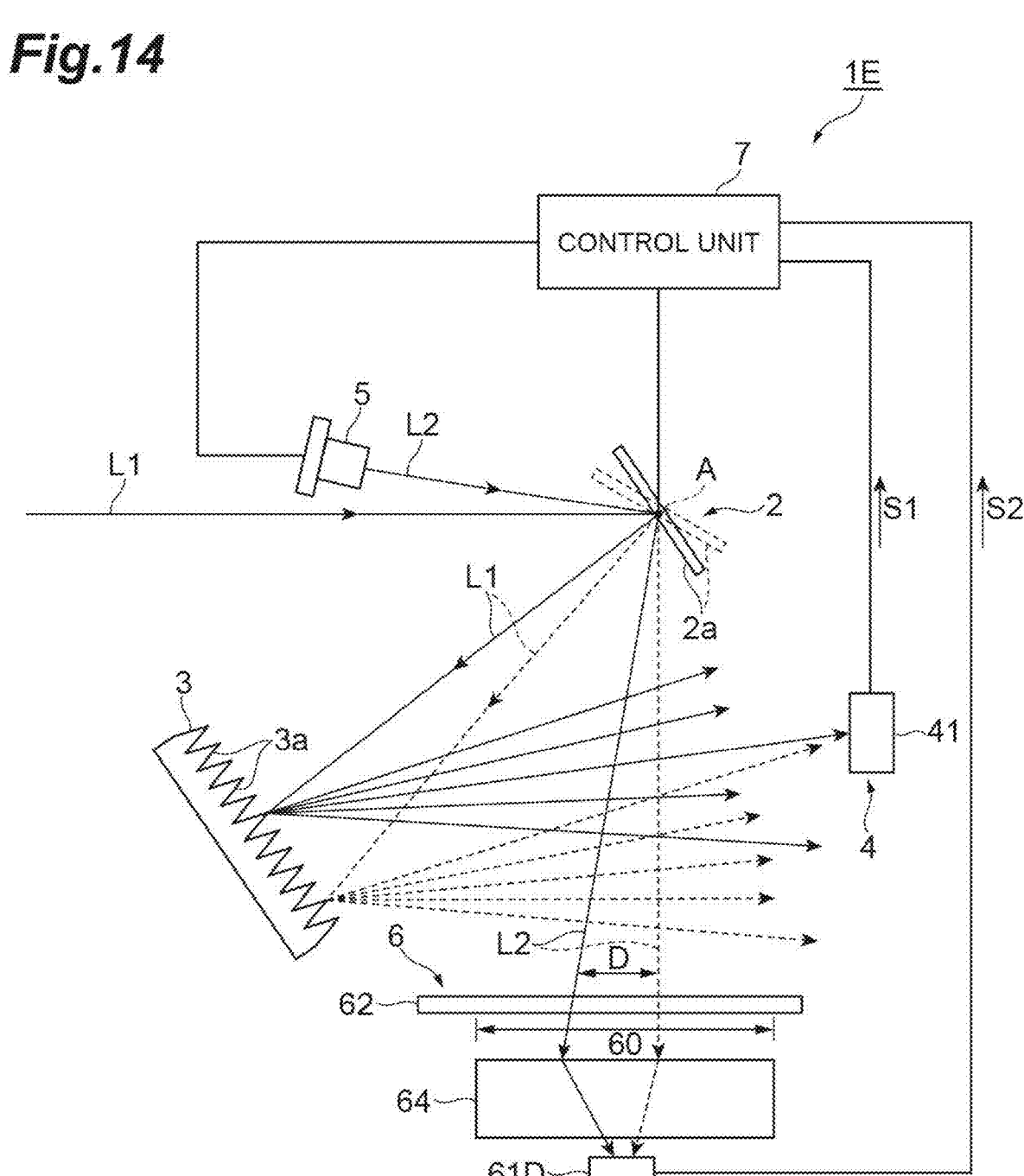
FIG. 14 is a configuration diagram of a spectroscopic device according to a fifth embodiment.

As illustrated in FIG. 14, a spectroscopic device 1E according to a fifth embodiment is mainly different from the spectroscopic device 1A according to the first embodiment in the configuration of the second light detection unit 6. A configuration of the spectroscopic device 1E excluding the second light detection unit 6 is the same as the configuration of the spectroscopic device 1A.

The second light detection unit 6 of the spectroscopic device 1E includes a filter 62, an optical waveguide (second optical member) 64, and a second light detector 61D. The filter 62 is disposed on an optical path between the swing surface 2a and the second light detector 61D. The elongated light receiving region 60 in which the direction D that is the moving direction of the inspection light L2 is the longitudinal direction is provided in the filter 62. The optical waveguide 64 is disposed on an optical path between the filter 62 and the second light detector 61D. The optical waveguide 64 condenses the inspection light L2 transmitted through the filter 62 on the second light detector 61D. The second light detector 61D is, for example, a single element and has a single light detection channel. Thus, the control unit 7 controls the second light detector 61D such that the charge is accumulated in each of the plurality of stop times t11 and the charge is read out in each of the plurality of operation times t12, and acquires the second detection signal S2 indicating the intensity in each of the plurality of stop times t11 from the second light detector 61D.

In the filter 62, as illustrated in (a) of FIG. 7, a transmittance of the inspection light L2 in the light receiving region 60 changes in accordance with the position in the direction D. Thus, the intensity of the second detection signal S2 output from the second light detector 61D changes in accordance with the incident position of the inspection light L2 on the filter 62. That is, the intensity of the second detection signal S2 output from the second light detector 61D changes in accordance with the swing angle of the swing surface 2a as illustrated in (b) of FIG. 7. Accordingly, the control unit 7 can calculate data indicating the swing angle of the swing surface 2a in each of the plurality of stop times t11 based on the second detection signal S2.

Similarly to the first embodiment, the control unit 7 generates the data regarding the wavelength of measurement light L1 based on the first detection signal S1 and the second detection signal S2. Specifically, the control unit 7 generates the data regarding the wavelength of the measurement light L1 based on the first detection signal S1, the data indicating the swing angle of the swing surface 2a in each of the plurality of stop times t11 (data calculated based on the second detection signal S2) and the data indicating the correspondence relationship between the swing angle of the swing surface 2a and the wavelength of the light incident on the first light detector 41. The control unit 7 may acquire in advance data indicating a correspondence relationship between the intensity of the second detection signal S2 and the wavelength of the light incident on the first light detector 41, and may generate the data regarding the wavelength of the measurement light L1 based on the first detection signal S1 and the second detection signal S2 without calculating the data indicating the swing angle of the swing surface 2a based on the second detection signal S2.

As described above, similarly to the spectroscopic device 1A, according to the spectroscopic device 1E, the data regarding the wavelength of the measurement light L1 can be accurately acquired.

In the spectroscopic device 1E, the control unit 7 controls the second light detector 61D such that the charge is accumulated in each of the plurality of stop times t11 and the charge is read out in each of the plurality of operation times t12. Consequently, for example, the swing angle of the swing surface 2a can be changed in a step shape while finely adjusting the swing angle of the swing surface 2a based on the second detection signal S2. In addition, for example, the swing angle of the swing surface 2a is adjusted to a desired swing angle based on the second detection signal S2, and data regarding a desired wavelength included in the measurement light L1 can be acquired.

In the spectroscopic device 1E, the optical waveguide 64 condenses the inspection light L2 having passed through the filter 62 on the second light detector 61D. Consequently, for example, the second light detector 61D can be downsized by using the single element as the second light detector 61D.

In the spectroscopic device 1E, the second light detector 61D has a single light detection channel. Consequently, a configuration of a readout circuit of the second light detector 61D can be simplified. The second light detector 61D may have a plurality of light detection channels, and in this case, the control unit 7 may acquire, as the second detection signal S2, a total value of the signals output from the plurality of light detection channels.

As viewed from the direction parallel to the axis A, the spectroscopic device 1E is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1E is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Figure 15:
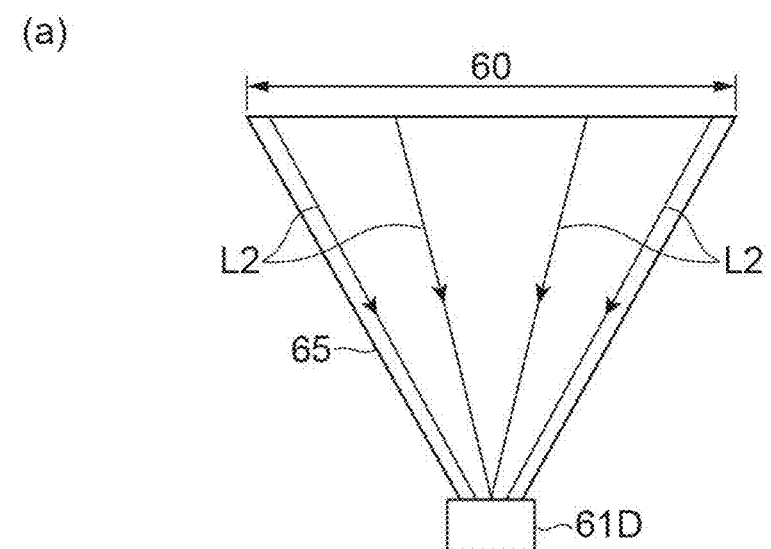
FIG. 15 is a configuration diagram of a second optical member of a modification.
Figure 15:
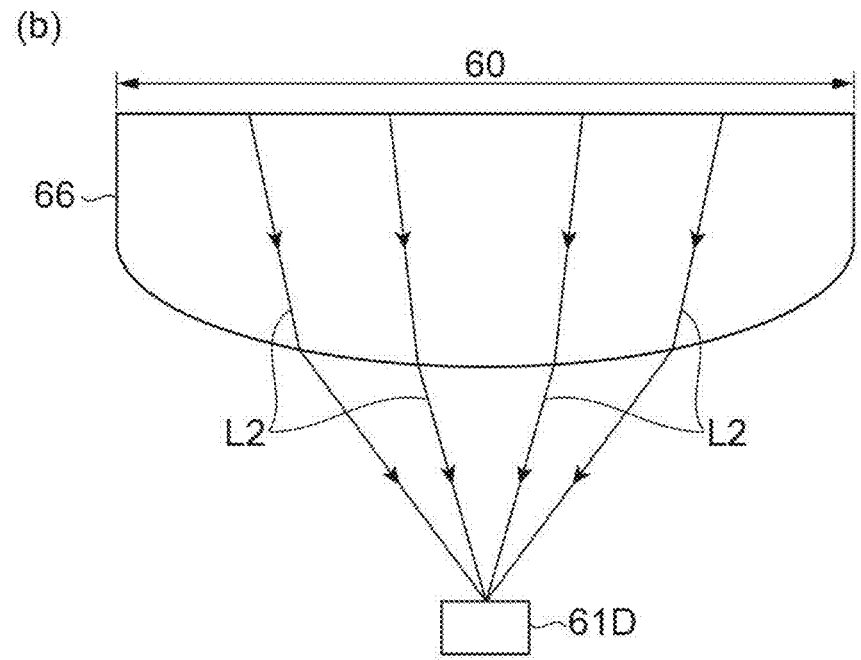

Instead of the optical waveguide 64, a fiber optical plate (second optical member) 65 that condenses the inspection light L2 from the light receiving region 60 to the second light detector 61D may be applied to the spectroscopic device 1E as illustrated in (a) of FIG. 15, or a lens (second optical member) 66 that condenses the inspection light L2 from the light receiving region 60 to the second light detector 61D may be applied to the spectroscopic device 1E as illustrated in (b) of FIG. 15. That is, the optical member disposed in front of the second light detector 61D is not limited to optical waveguide 64 as long as the optical member can collect the inspection light L2 from the light receiving region 60 to the second light detector 61D. In addition, an optical member (optical waveguide 64, fiber optical plate 65, lens 66, and the like) capable of condensing the inspection light L2 on the second light detector 61D and the second light detector 61D may be applied to the spectroscopic device 1C according to the third embodiment together with the slit member 63.

Sixth Embodiment

Figure 16:
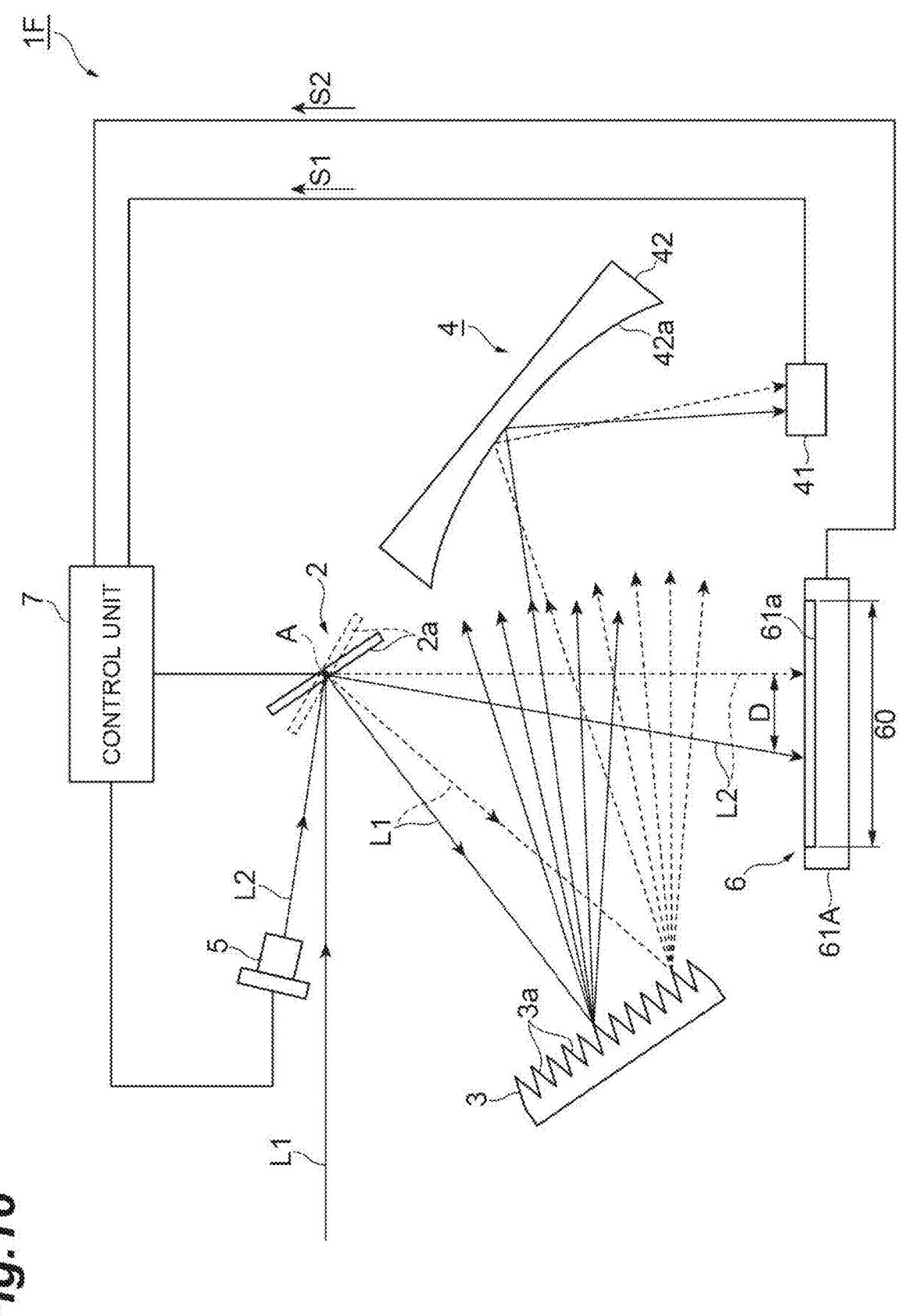
FIG. 16 is a configuration diagram of a spectroscopic device according to a sixth embodiment.

As illustrated in FIG. 16, a spectroscopic device 1F according to a sixth embodiment is mainly different from the spectroscopic device 1A according to the first embodiment in a configuration of a first light detection unit 4. A configuration of the spectroscopic device 1F excluding the first light detection unit 4 is the same as the configuration of the spectroscopic device 1A.

The first light detection unit 4 of the spectroscopic device 1F includes a depressed mirror 42 and a first light detector 41. The depressed mirror 42 is disposed on an optical path between the diffraction grating 3 and the first light detector 41. The depressed mirror 42 has a mirror surface 42a that condenses a part of the measurement light L1 dispersed by the diffraction grating 3 on the first light detector 41. The mirror surface 42a is a concave surface having a curvature in both a section parallel to the axis A and a section perpendicular to the axis A. Therefore, a depressed mirror 42 can be referred to as a concave mirror.

As described above, similarly to the spectroscopic device 1A, according to the spectroscopic device 1F, the data regarding the wavelength of the measurement light L1 can be accurately acquired.

In the spectroscopic device 1F, the depressed mirror 42 is disposed on an optical path between the diffraction grating 3 and the first light detector 41. Consequently, a part of the measurement light L1 diffracted by the diffraction grating 3 can be efficiently incident on the first light detection unit 4.

As viewed from the direction parallel to the axis A, the spectroscopic device 1F is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1F is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Instead of the depressed mirror 42, a lens that condenses the measurement light L1 on the first light detector 41 may be applied to the spectroscopic device 1F. That is, the optical member disposed in front of the first light detector 41 is not limited to the depressed mirror 42 as long as the optical member can collect the measurement light L1 to the first light detector 41. In addition, an optical member (depressed mirror 42, lens, and the like) capable of condensing the measurement light L12 on the first light detector 41 may be applied to each of the spectroscopic device 1B according to the second embodiment, the spectroscopic device 1C according to the third embodiment, the spectroscopic device 1D according to the fourth embodiment, and the spectroscopic device 1E according to the fifth embodiment.

Seventh Embodiment

Figure 17:
FIG. 17 is a configuration diagram of a spectroscopic device according to a seventh embodiment.

As illustrated in FIG. 17, a spectroscopic device 1G according to a seventh embodiment is mainly different from the spectroscopic device 1A according to the first embodiment in the disposition position of the diffraction grating 3 and the configuration of the first light detection unit 4. A configuration of the spectroscopic device 1G excluding the disposition position of the diffraction grating 3 and the first light detection unit 4 are the same as the configuration of the spectroscopic device 1A.

The diffraction grating 3 of the spectroscopic device 1G is disposed at a position (first position) on the swing surface 2a of the swing element 2. As an example, a width of the diffraction grating 3 in each of the direction parallel to the axis A and the direction perpendicular to the axis A is about several mm (preferably, about 1 to 5 mm). The plurality of grating grooves 3a are aligned in the direction perpendicular to the axis A in a state of extending in the direction parallel to the axis A. The first light detection unit 4 of the spectroscopic device 1G includes a depressed mirror 42 and a first light detector 41. The depressed mirror 42 is disposed on an optical path between the diffraction grating 3 and the first light detector 41. The depressed mirror 42 has a mirror surface 42a that condenses a part of the measurement light L1 dispersed by the diffraction grating 3 on the first light detector 41. The mirror surface 42a is a concave surface having a curvature in both a section parallel to the axis A and a section perpendicular to the axis A.

In the spectroscopic device 1G, the measurement light L1 traveling to be incident on the swing surface 2a is incident on the diffraction grating 3 along the direction perpendicular to the axis A. The measurement light L1 incident on the diffraction grating 3 is dispersed in accordance with a wavelength along a plane perpendicular to the axis A. A part of the measurement light L1 dispersed by the diffraction grating 3 is condensed on the first light detector 41 by the depressed mirror 42 and is detected by the first light detector 41. On the other hand, the inspection light L2 emitted from the light source 5 to be incident on the swing surface 2a is incident on the diffraction grating 3 along the direction perpendicular to the axis A. The inspection light L2 incident on the diffraction grating 3 is dispersed along a plane perpendicular to the axis A. A part of the inspection light L2 dispersed by the diffraction grating 3 is detected by the second light detector 61A. A part of the inspection light L2 dispersed by the diffraction grating 3 is light of a predetermined order (for example, zero-order light), and the spectroscopic device 1G is configured such that only the light of the predetermined order out of the inspection light L2 is incident on the second light detector 61A regardless of the magnitude of the swing angle of the swing surface 2a.

As described above, in the spectroscopic device 1G, the light source 5 emits the inspection light L2 to be incident on the swing surface 2a of the swing element 2, and the second light detector 61A detects a part of the inspection light L2 dispersed by the diffraction grating 3 on the swing surface 2a. The second light detection unit 6 including the second light detector 61A has the elongated light receiving region 60 in which the direction D that is the moving direction of the inspection light L2 is the longitudinal direction. Accordingly, the incident position of the inspection light L2 in the light receiving region 60 can be specified in the direction D, and based on the data indicating the incident position of the inspection light L2 in the light receiving region 60, for example, the data indicating the swing angle of the swing surface 2a when the first light detector 41 detects a part of the measurement light L1 can be accurately acquired. Accordingly, according to the spectroscopic device 1G, the data regarding the wavelength of the measurement light L1 can be acquired with high accuracy.

In the spectroscopic device 1G, the diffraction grating 3 is disposed at a position on the swing surface 2a. Consequently, the configuration of the spectroscopic device 1G can be simplified.

As viewed from the direction parallel to the axis A, the spectroscopic device 1G is configured such that an optical axis of the measurement light L1 reflected by the depressed mirror 42 intersects an optical axis of the inspection light L2 dispersed by the diffraction grating 3 disposed at the first position on the swing surface 2a. Consequently, the downsizing of the entire device can be realized.

As viewed from the direction parallel to the axis A, the spectroscopic device 1G is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Each of the configuration of the second light detection unit 6 according to the second embodiment, the configuration of the second light detection unit 6 according to the third embodiment, the configuration of the second light detection unit 6 according to the fourth embodiment, and the configuration of the second light detection unit 6 according to the fifth embodiment may be applied to the spectroscopic device 1G.

Eighth Embodiment

Figure 18:
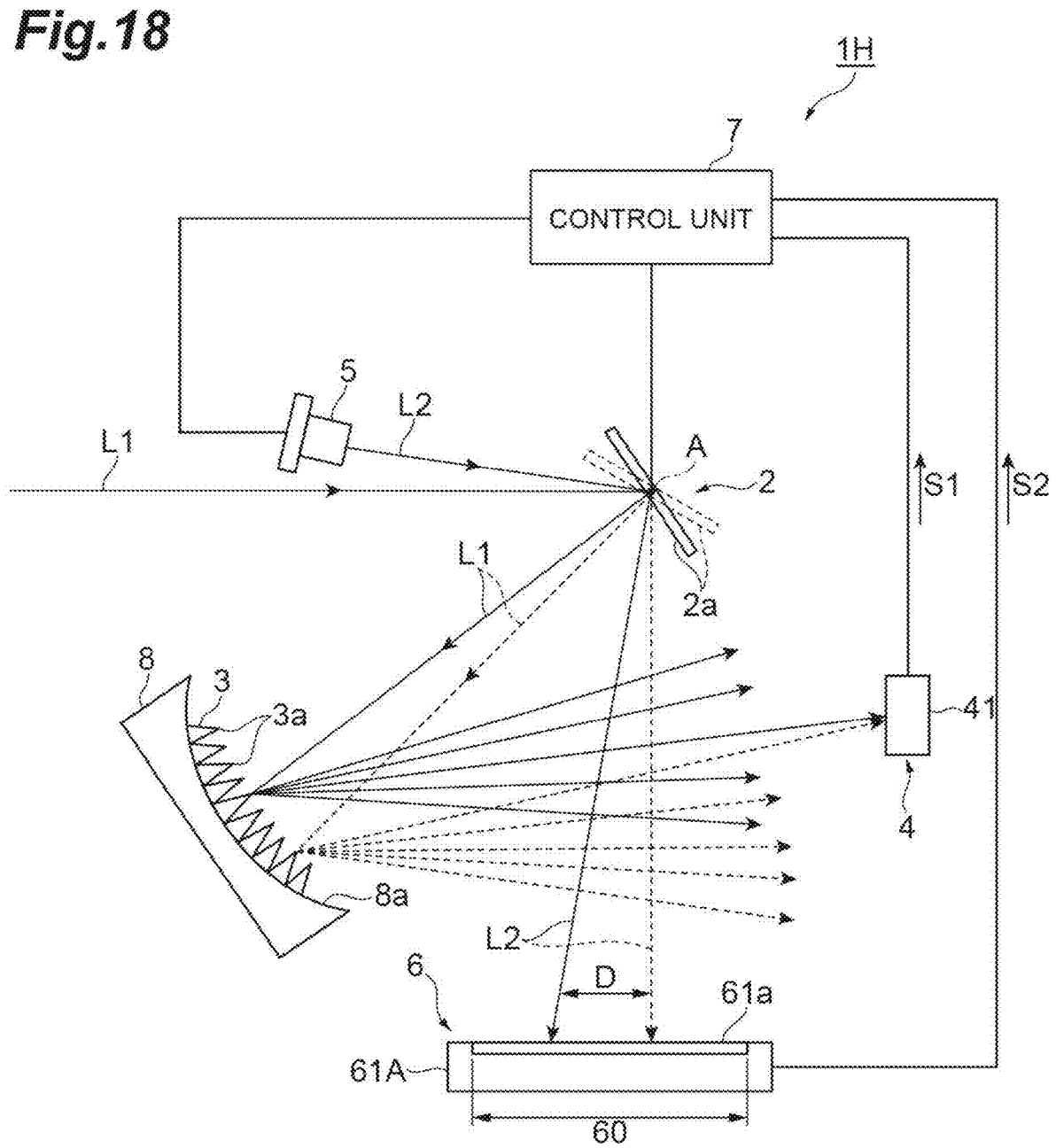
FIG. 18 is a configuration diagram of a spectroscopic device according to an eighth embodiment.

As illustrated in FIG. 18, a spectroscopic device 1H according to an eighth embodiment is mainly different from the spectroscopic device 1A according to the first embodiment in that the diffraction grating 3 is formed along a depressed surface 8a of a support member 8. A configuration of the spectroscopic device 1H except that the diffraction grating 3 is formed along the depressed surface 8a of the support member 8 is the same as the configuration of the spectroscopic device 1A.

In the spectroscopic device 1H, the support member 8 has the depressed surface 8a, and is disposed such that the measurement light L1 is incident on the depressed surface 8a. The depressed surface 8a is a concave surface having a curvature in both a section parallel to the axis A and a section perpendicular to the axis A. Therefore, a depressed surface 8a can be referred to as a concave surface. The diffraction grating 3 is formed along the depressed surface 8a. The plurality of grating grooves 3a are aligned in the direction perpendicular to the axis A in a state of extending in the direction parallel to the axis A.

As described above, similarly to the spectroscopic device 1A, according to the spectroscopic device 1H, the data regarding the wavelength of the measurement light L1 can be accurately acquired.

In the spectroscopic device 1H, the diffraction grating 3 is formed along the depressed surface 8a of the support member 8. Consequently, a part of the measurement light L1 diffracted by the diffraction grating 3 can be efficiently incident on the first light detection unit 4.

As viewed from the direction parallel to the axis A, the spectroscopic device 1H is configured such that an optical axis of the measurement light L1 dispersed by the diffraction grating 3 disposed at the second position away from the swing surface 2a intersects an optical axis of the inspection light L2 reflected by the swing element 2. Consequently, the downsizing of the entire device can be realized.

As viewed from the direction parallel to the axis A, the spectroscopic device 1H is configured such that the measurement light L1 and the inspection light L2 are incident from one side with respect to a normal of the swing surface 2a intersecting the axis A. Consequently, the position of each member is optimized, and thus, it is possible to realize the downsizing of the entire device.

Each of the configuration of the second light detection unit 6 according to the second embodiment, the configuration of the second light detection unit 6 according to the third embodiment, the configuration of the second light detection unit 6 according to the fourth embodiment, and the configuration of the second light detection unit 6 according to the fifth embodiment may be applied to the spectroscopic device 1H.

Modification

The present disclosure is not limited to the above embodiments. For example, the second light detection unit 6 has the elongated light receiving region 60 in which the direction D that is the movement of the inspection light L2 is the longitudinal direction, and may be configured to be able to specify the incident position of the inspection light L2 in the light receiving region 60 in the direction D. In addition, the optical member including the elongated light receiving region 60 in which the direction D that is the moving direction of the inspection light L2 is the longitudinal direction is not limited to the above, and may be, for example, a condenser lens or the like.

In addition, for example, in a case where the second light detectors 61B, 61C, and 61D having the single light detection channel are used, the control unit 7 may control the swing element 2 such that the swing angle of the swing surface 2a changes linearly, and may acquire the first detection signal S1 and the second detection signal S2 when the swing angle of the swing surface 2a changes linearly. In addition, in a case where first time t1 and second time t2 are set as one cycle, the control unit 7 may repeat similar processing in a plurality of cycles and may integrate a plurality of first detection signals S1 associated with swing angles of the same value. In addition, the control unit 7 may control the swing element 2 such that the swing angle of the swing surface 2a changes in a step shape in second time t2. In addition, the control unit 7 may cause the swing element 2 to swing by resonance driving. That is, the control unit 7 may control the swing element 2 to operate in a non-linear mode (resonance drive mode). A relationship between the time and the swing angle of the swing surface 2a in the swing element 2 is not limited to a triangular wave illustrated in FIG. 3, and may be, for example, a saw tooth, a sine wave, or the like.

In addition, in a case where the diffraction grating 3 is disposed at a position (first position) on the swing surface 2a of the swing element 2, a mirror may be provided on the swing surface 2a separately from the diffraction grating 3. The swing element 2 may be configured such that the measurement light L1 is incident on the diffraction grating 3 on the swing surface 2a and the inspection light L2 is incident on the mirror on the swing surface 2a, and the second light detection unit 6 may be configured to detect the inspection light reflected by the swing surface 2a. According to such a configuration, even in a case where the diffraction grating 3 is disposed at the position on the swing surface 2a, since the inspection light L2 is not dispersed, deterioration of a beam profile of the inspection light L2 in the second light detection unit 6 can be suppressed, and the detection accuracy of the inspection light L2 in the second light detection unit 6 can be improved.

In addition, each of the second light detectors 61A, 61B, 61C, and 61D may be formed by one light detection element, or may be formed by a plurality of light detection elements (each light detection element is, for example, a discrete single element) arrayed in the direction D. In a case where each of the second light detectors 61A, 61B, 61C, and 61D includes a plurality of light detection elements, a gap may be generated between adjacent light detection elements, but the elongated light receiving region 60 may be formed as a whole. In a case where each of the second light detectors 61A, 61B, 61C, and 61D is formed by a plurality of light detection elements arrayed in the direction D, the second light detectors may include a plurality of light detection elements aligned to correspond to the elongated light receiving region 60.

In addition, each configuration in the above-described embodiment and modifications can be randomly applied to each configuration in other embodiments or modifications.

REFERENCE SIGNS LIST

1A, 1B, 1C, 1D, 1E, 1F, 1G, 1H spectroscopic device
2 swing element
2a swing surface
3 diffraction grating
4 first light detection unit
5 light source
6 second light detection unit
7 control unit
8 support member
8a depressed surface
21 support portion
22 movable portion
23 coupling portion
41 first light detector
60 light receiving region
61A, 61B, 61C, 61D second light detector
61a light receiving surface
62 filter (first optical member)
63 slit member (first optical member)
63a slit
64 optical waveguide (second optical member)
65 fiber optical plate (second optical member)
66 lens (second optical member)
A axis (predetermined axis)
D direction (moving direction or longitudinal direction)
L1 measurement light
L2 inspection light
S1 first detection signal
S2 second detection signal

The invention claimed is:

1. A spectroscopic device comprising:
   a swing element having a swing surface and disposed such that measurement light is incident on the swing surface;
   a diffraction grating disposed at a first position on the swing surface or a second position away from the swing surface, the diffraction grating configured to disperse the measurement light traveling to be incident on the swing surface in a case where the diffraction grating is disposed at the first position, and the diffraction grating configured to disperse the measurement light reflected by the swing surface in a case where the diffraction grating is disposed at the second position;

a first light detection unit including a first light detector configured to detect a part of the measurement light dispersed by the diffraction grating;

a light source configured to emit inspection light to be incident on the swing surface; and a second light detection unit including a second light detector configured to detect a part of the inspection light dispersed by the diffraction grating or the inspection light reflected by the swing surface in a case where the diffraction grating is disposed at the first position and configured to detect the inspection light reflected by the swing surface in a case where the diffraction grating is disposed at the second position, wherein the swing element includes a support portion, a movable portion having the swing surface, and a coupling portion coupling the support portion and the movable portion such that a swing angle of the swing surface changes with a predetermined axis as a center line, and the second light detection unit has an elongated light receiving region in which a moving direction of the inspection light is a longitudinal direction.

2. The spectroscopic device according to claim 1, wherein the diffraction grating is disposed at the second position.

3. The spectroscopic device according to claim 2, further comprising:

a support member having a depressed surface and disposed such that the measurement light is incident on the depressed surface, wherein the diffraction grating is formed along the depressed surface.

4. The spectroscopic device according to claim 1, wherein the diffraction grating is disposed at the first position.

5. The spectroscopic device according to claim 1, further comprising:

a control unit configured to control each of the swing element, the first light detector, and the second light detector, wherein the control unit controls the swing element such that the swing angle changes in a step shape including a plurality of stop times during which the swing angle is maintained constant and a plurality of operation times during which the swing angle changes, acquires a first detection signal based on an amount of charges accumulated in the first light detector in each of the plurality of stop times and a second detection signal based on an amount of charges accumulated in the second light detector in each of the plurality of stop times, and generates data regarding a wavelength of the measurement light based on the first detection signal and the second detection signal.

6. The spectroscopic device according to claim 5, wherein the control unit controls the swing element such that the swing angle changes in a first rotation with the axis as a center line in a first time and the swing angle changes in a second rotation opposite to the first rotation with the axis as the center line in a second time after the first time.

7. The spectroscopic device according to claim 6, wherein the control unit controls the swing element such that the swing angle changes in the step shape in any one of the first time or the second time.

8. The spectroscopic device according to claim 7, wherein one time of the first time and the second time during which the swing angle changes in the step shape is longer than the other time of the first time and the second time.

9. The spectroscopic device according to claim 7, wherein the second light detector has a plurality of light detection channels aligned in the longitudinal direction, and the control unit controls the swing element such that at least a part of accumulations of the charges in the plurality of stop times is performed for each different light detection channel of the plurality of light detection channels, and controls the second light detector such that the accumulations of the charges are performed continuously over the plurality of stop times and readout of the charge is performed after the plurality of stop times.

10. The spectroscopic device according to claim 9, wherein the control unit controls the swing element such that the swing angle changes in the step shape in the first time, and controls the second light detector such that the accumulations of the charges are performed simultaneously over the plurality of stop times in the first time and the readout of the charge is performed in the second time.

11. The spectroscopic device according to claim 5, wherein the control unit controls the second light detector such that accumulation of the charge is performed in each of the plurality of stop times and readout of the charge is performed in each of the plurality of operation times.

12. The spectroscopic device according to claim 1, wherein the light receiving region is provided in the second light detector, and the second light detector includes a plurality of light detection channels aligned in the longitudinal direction in the light receiving region.

13. The spectroscopic device according to claim 1, wherein the light receiving region is provided in the second light detector, the second light detector has a light receiving surface extending in the longitudinal direction in the light receiving region, and a width of the light receiving surface in a direction perpendicular to the longitudinal direction changes in accordance with a position in the longitudinal direction.

14. The spectroscopic device according to claim 1, wherein the second light detection unit further includes a first optical member disposed on an optical path between the swing surface and the second light detector, the light receiving region is provided in the first optical member, and the first optical member is a filter of which a transmittance of the inspection light in the light receiving region changes in accordance with a position in the longitudinal direction.

15. The spectroscopic device according to claim 1, wherein the second light detection unit further includes a first optical member disposed on an optical path between the swing surface and the second light detector, the light receiving region is provided in the first optical member, the first optical member has a slit extending in the longitudinal direction in the light receiving region, and a width of the slit in a direction perpendicular to the longitudinal direction changes in accordance with a position in the longitudinal direction.

16. The spectroscopic device according to claim 14,
wherein the second light detection unit further includes a
 second optical member disposed on an optical path
 between the first optical member and the second light
 detector, and
the second optical member condenses the inspection light
 having passed through the first optical member on the
 second light detector.

17. The spectroscopic device according to claim 13,
wherein the second light detector has a single light
 detection channel.

18. The spectroscopic device according to claim 1,
wherein the inspection light has a center wavelength
 outside a wavelength range of the measurement light.

19. The spectroscopic device according to claim 1,
wherein the second light detector has sensitivity to a
 wavelength outside a wavelength range of the measure-
 ment light.

* * * * *